(12) United States Patent
Wei et al.

(10) Patent No.: US 8,473,734 B2
(45) Date of Patent: *Jun. 25, 2013

(54) MULTI-SERVICE VPN NETWORK CLIENT FOR MOBILE DEVICE HAVING DYNAMIC FAILOVER

(75) Inventors: Yin Wei, San Jose, CA (US); Subramanian Iyer, Fremont, CA (US); Richard Campagna, San Jose, CA (US); James Wood, Gilroy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/968,067

(22) Filed: Dec. 14, 2010

(65) Prior Publication Data

US 2012/0005477 A1   Jan. 5, 2012

Related U.S. Application Data

(60) Provisional application No. 61/398,758, filed on Jun. 30, 2010.

(51) Int. Cl.
*H04L 29/06* (2006.01)
(52) U.S. Cl.
USPC ........................................................ 713/153
(58) Field of Classification Search
USPC ................................................ 709/153, 217
See application file for complete search history.

(56) References Cited

U.S. PATENT DOCUMENTS

| | | | |
|---|---|---|---|
| 6,473,863 B1 | 10/2002 | Genty et al. | |
| 6,675,225 B1 | 1/2004 | Genty et al. | |
| 6,751,190 B1 | 6/2004 | Swallow | |
| 6,856,651 B2 | 2/2005 | Singh | |
| 2002/0013150 A1 | 1/2002 | McKenna et al. | |
| 2002/0018456 A1 | 2/2002 | Kakemizu et al. | |
| 2002/0133534 A1 | 9/2002 | Forslow | |
| 2003/0021253 A1 | 1/2003 | Jung | |

(Continued)

FOREIGN PATENT DOCUMENTS

| WO | 2006074072 A2 | 7/2006 |
|---|---|---|
| WO | 2008017064 A2 | 7/2008 |

OTHER PUBLICATIONS

Office Action from U.S. Appl. No. 12/967,977, dated Sep. 1, 2011, 9 pp.

(Continued)

*Primary Examiner* — Kambiz Zand
*Assistant Examiner* — Abiy Getachew
(74) *Attorney, Agent, or Firm* — Shumaker & Sieffert, P.A.

(57) ABSTRACT

An integrated, multi-service network client for cellular mobile devices is described. The multi-service network client can be deployed as a single software package on cellular mobile network devices to provide integrated services including secure enterprise virtual private network (VPN) connectivity, acceleration, security management including monitored and enforced endpoint compliance, and collaboration services. Once installed on the cellular mobile device, the multi-service client establishes the VPN connection to concurrently include both a layer three (L3) tunnel that uses a first type of transport layer protocol of the operating system and a layer four (L4) tunnel that uses a second type of transport layer protocol of the operating system. The VPN handler determines whether network ports associated with the L3 tunnel are unblocked by an operating system and, when the network ports are unblocked, automatically transitions from the L4 tunnel to the L3 tunnel without terminating the VPN connection.

28 Claims, 14 Drawing Sheets

U.S. PATENT DOCUMENTS

| | | |
|---|---|---|
| 2003/0088698 A1 | 5/2003 | Singh et al. |
| 2003/0125048 A1 | 7/2003 | Lockhart |
| 2003/0131245 A1 | 7/2003 | Linderman |
| 2003/0226013 A1 | 12/2003 | Dutertre |
| 2004/0120295 A1 | 6/2004 | Liu et al. |
| 2004/0148346 A1 | 7/2004 | Weaver et al. |
| 2004/0158705 A1 | 8/2004 | Burdett et al. |
| 2004/0168051 A1 | 8/2004 | Guo et al. |
| 2004/0208155 A1 | 10/2004 | Park et al. |
| 2004/0225895 A1 | 11/2004 | Mukherjee et al. |
| 2004/0268142 A1 | 12/2004 | Karjala |
| 2005/0086371 A1 | 4/2005 | Jung |
| 2005/0125542 A1 | 6/2005 | Zhu |
| 2005/0128979 A1 | 6/2005 | Wu et al. |
| 2005/0198498 A1 | 9/2005 | Gaur et al. |
| 2005/0201388 A1 | 9/2005 | Suh et al. |
| 2005/0208947 A1 | 9/2005 | Bahl |
| 2006/0005008 A1* | 1/2006 | Kao .......................... 713/153 |
| 2006/0023861 A1 | 2/2006 | Carlson |
| 2006/0067265 A1 | 3/2006 | Chen et al. |
| 2006/0067271 A1 | 3/2006 | Chen et al. |
| 2006/0079250 A1 | 4/2006 | Lockhart |
| 2006/0104252 A1 | 5/2006 | Song et al. |
| 2006/0111113 A1 | 5/2006 | Waris |
| 2006/0182083 A1 | 8/2006 | Nakata et al. |
| 2006/0195547 A1* | 8/2006 | Sundarrajan et al. ......... 709/217 |
| 2006/0195840 A1 | 8/2006 | Sundarrajan et al. |
| 2006/0221916 A1 | 10/2006 | Taylor et al. |
| 2006/0230445 A1 | 10/2006 | Huang |
| 2006/0233141 A1 | 10/2006 | Iyer et al. |
| 2007/0006295 A1 | 1/2007 | Haverinen et al. |
| 2007/0008924 A1 | 1/2007 | Moran |
| 2007/0008980 A1 | 1/2007 | Dommety et al. |
| 2007/0118895 A1 | 5/2007 | Coskun et al. |
| 2007/0124803 A1 | 5/2007 | Taraz |
| 2007/0174909 A1 | 7/2007 | Burchett et al. |
| 2007/0177550 A1 | 8/2007 | Kwon et al. |
| 2007/0206572 A1 | 9/2007 | Silver et al. |
| 2008/0034198 A1 | 2/2008 | He et al. |
| 2008/0081605 A1 | 4/2008 | Cole |
| 2008/0288624 A1 | 11/2008 | Armangil |
| 2010/0057919 A1 | 3/2010 | Leitheiser et al. |

OTHER PUBLICATIONS

Response to Office Action dated Sep. 1, 2011, from U.S. Appl. No. 12/967,977, filed Oct. 25, 2011, 15 pp.

Extended European Search Report mailed Oct. 13, 2011 in corresponding EP Application No. 11169568.0, 8 pgs.

"Juniper Junos Pulse SSL VPN for iPhone", LifeInTECH Blog, available at http://www.lifeintech.com/blog/2010/6/12/juniper-junos-pulse-ssl-vpn-for-iphone.html, Jun. 12, 2010, 7 pgs.

Davenport, Matt, "Creating an iPhone Icon for your Website Bookmark", Tutorial Help Centre, available at http://www.tutorialhelpcentre.com/tutorials/Creating_an_iPhone_icon_for_your_website_bookmark, Jul. 29, 2009, 2 pgs.

Juniper Networks Secure Access Administration Guide Release 6.5, 2008, 1078 pp.

Juniper® Networks Solution Brief, "Junos Pulse: Mobility Redefined," Oct. 2009, 4 pp.

Juniper® Networks Solution Brief, "Empowering Mobile Productivity," Feb. 2010, 4 pp.

U.S. Appl. No. 11/226,501, by Shekar Kshirsagar, filed Sep. 14, 2005.

U.S. Appl. No. 11/236,987, by Roger Chickering, filed Sep. 28, 2005.

U.S. Appl. No. 12/967,977, by Yin Wei, filed Dec. 14, 2010.

U.S. Appl. No. 12/968,013, by Yin Wei, filed Dec. 14, 2010.

U.S. Appl. No. 12/968,048, by Yin Wei, filed Dec. 14, 2010.

U.S. Appl. No. 12/968,015, by Yin Wei, filed Dec. 14, 2010.

U.S. Appl. No. 12/968,043, by Yin Wei, filed Dec. 14, 2010.

U.S. Appl. No. 12/968,095, by Yin Wei, filed Dec. 14, 2010.

U.S. Appl. No. 11/226,501, by Shekhar Kshirsagar, filed Sep. 14, 2005.

Response filed Jun. 27, 2012 to the EPO Communication dated Jan. 9, 2012 in the corresponding EP Application 11169568.0, 20 pgs.

Non-Final Office Action from U.S. Appl. No. 12/968,095, dated Oct. 29, 2012, 15 pp.

Response to Office Action dated Aug. 31, 2012, from U.S. Appl. No. 12/968,015, filed Nov. 30, 2012, 16 pp.

Response to Office Action dated Oct. 4, 2012, from U.S. Appl. No. 12/968,013, filed Jan. 4, 2013, 15 pp.

Response to Office Action dated Oct. 10, 2012, from U.S. Appl. No. 12/968,048, filed Jan. 10, 2013, 15 pp.

Response to Office Action dated Oct. 1, 2012, from U.S. Appl. No. 12/968,043, filed Dec. 28, 2012, 16 pp.

Response to Office Action dated Oct. 29, 2012, from U.S. Appl. No. 12/968,095, filed Jan. 18, 2013, 17 pp.

Office Action from U.S. Patent Application No. 12/968,015, dated Aug. 31, 2012, 66 pp.

Office Action from U.S. Appl. No. 12/968,013, dated Oct. 4, 2012, 46 pp.

Office Action from U.S. Appl. No. 12/968,048, dated Oct. 10, 2012, 14 pp.

Office Action from U.S. Appl. No. 12/968,043, dated Oct. 1, 2012, 48 pp.

* cited by examiner

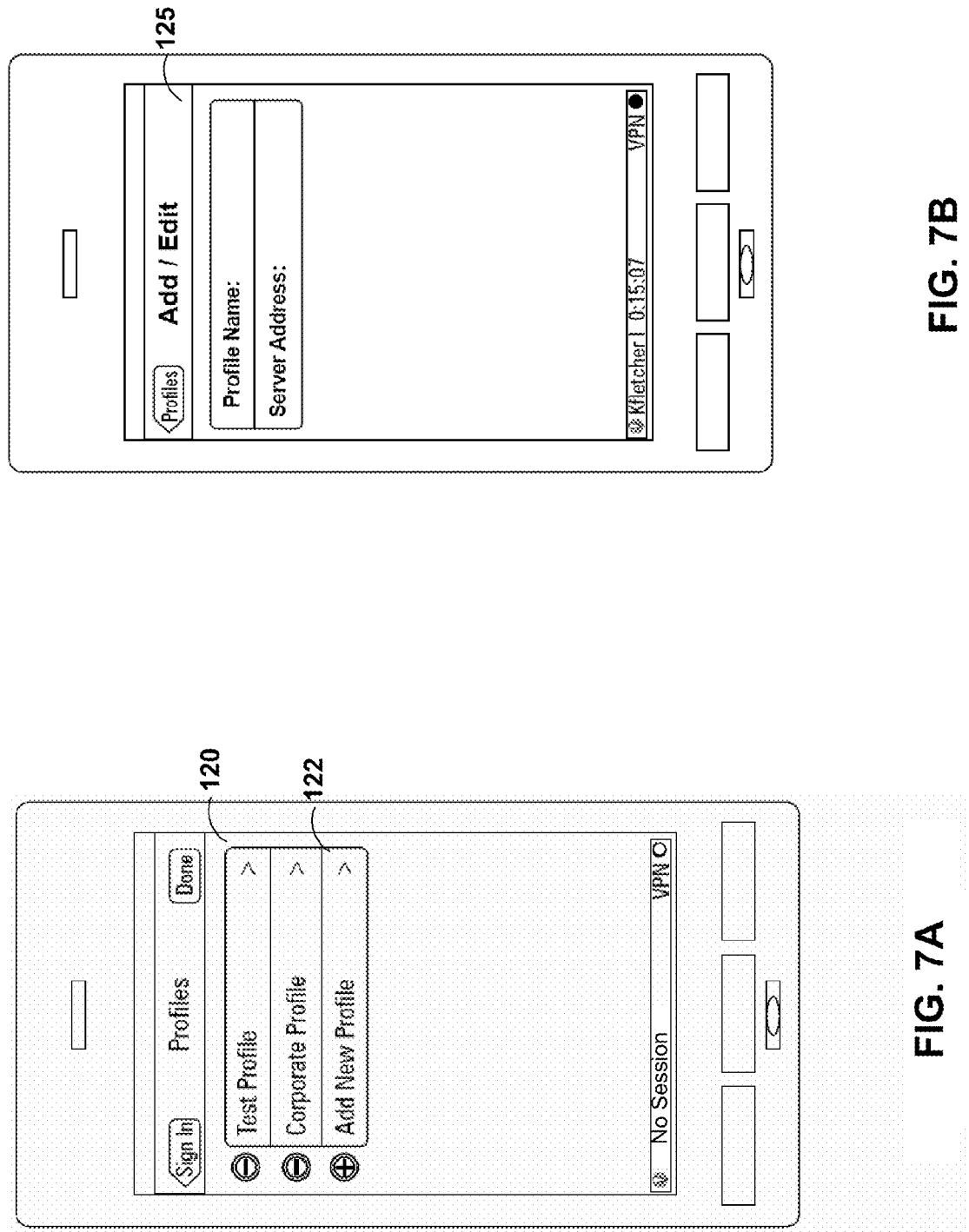

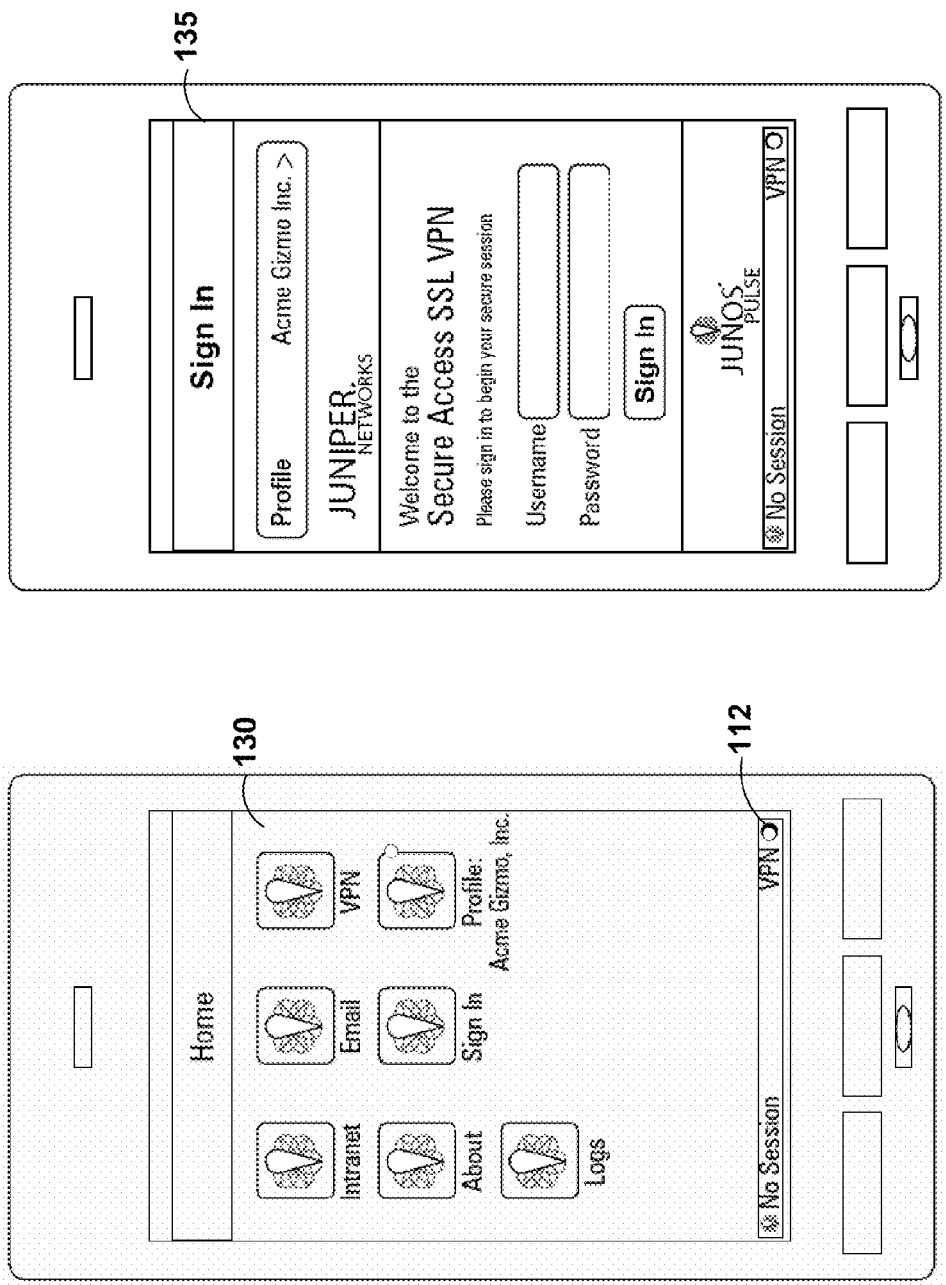

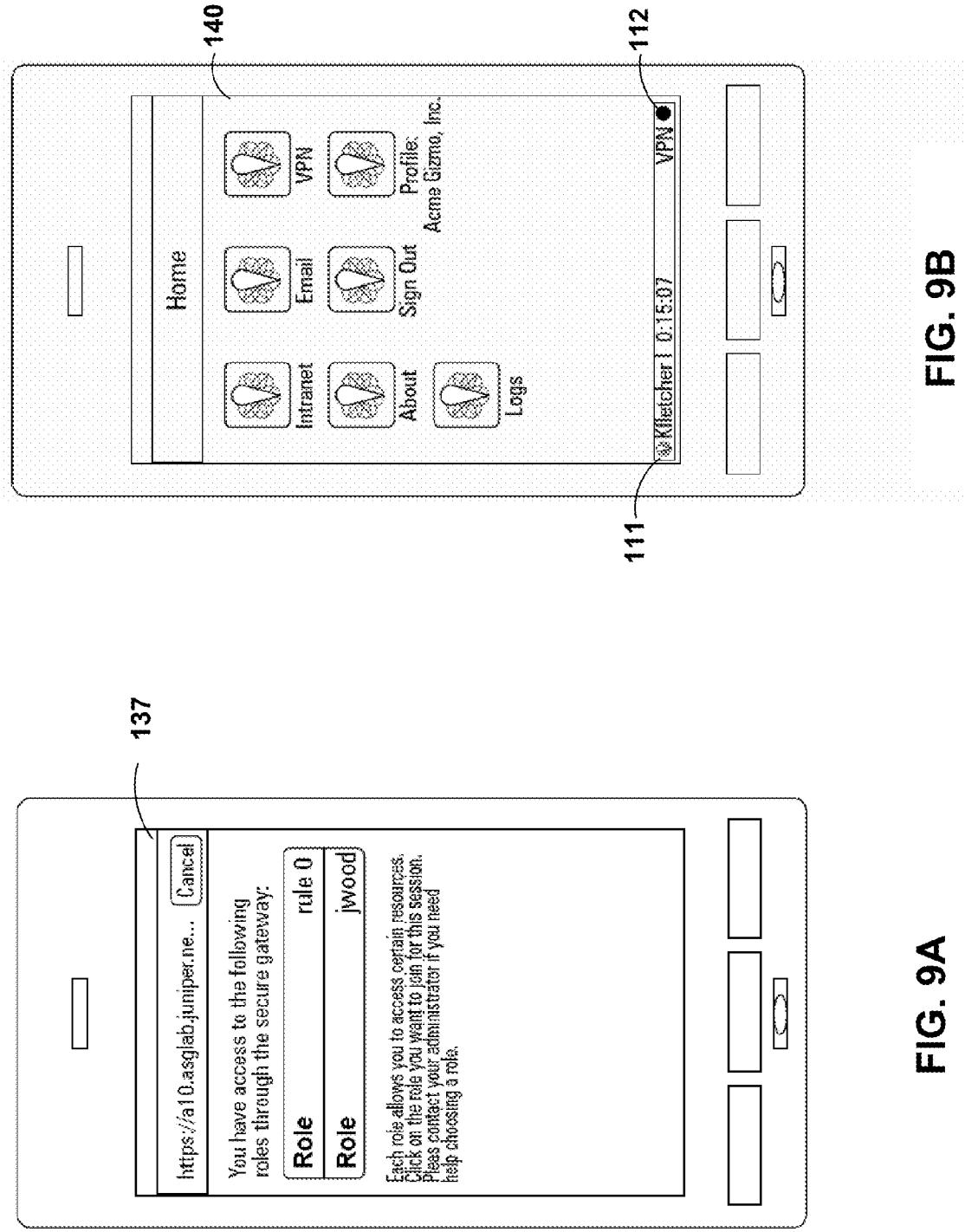

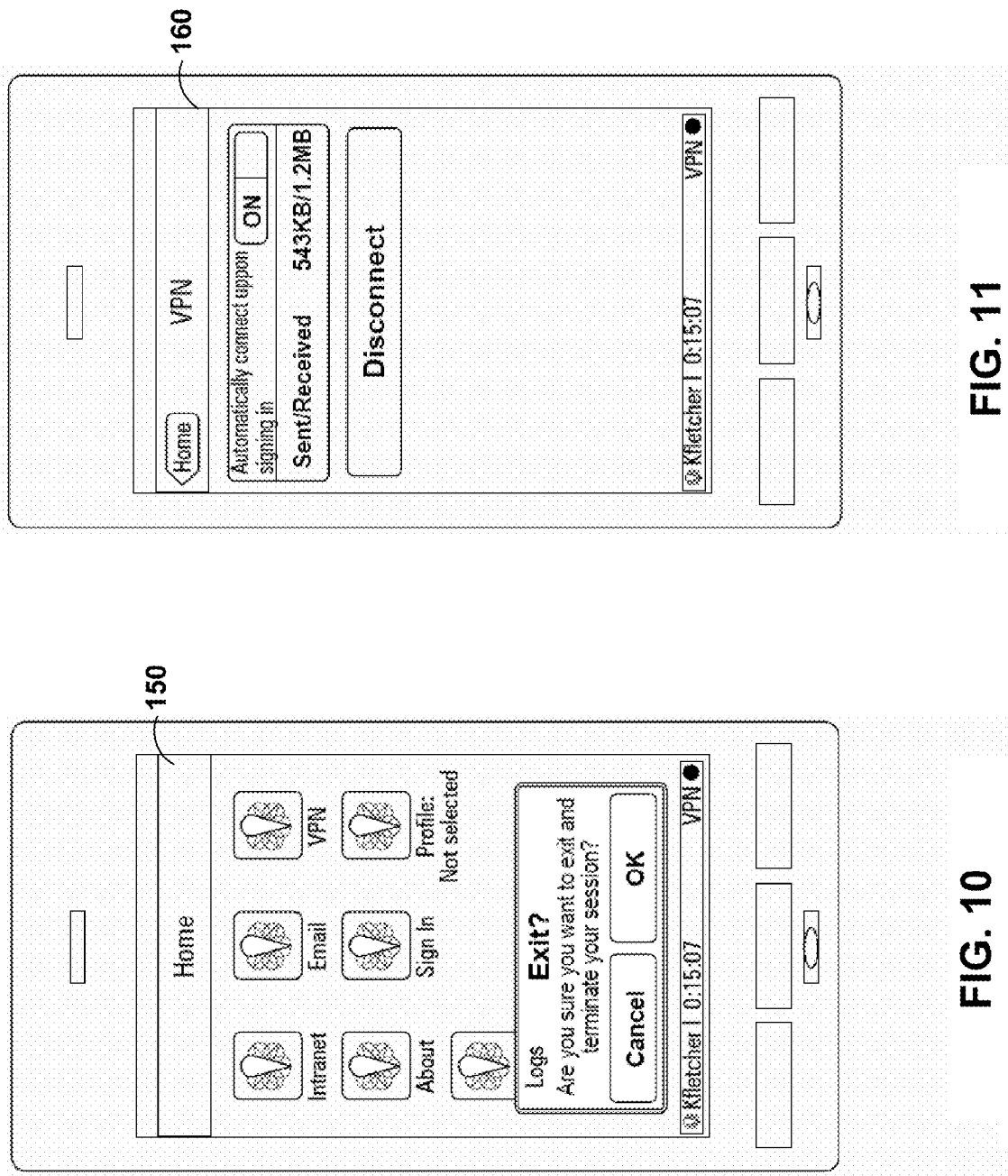

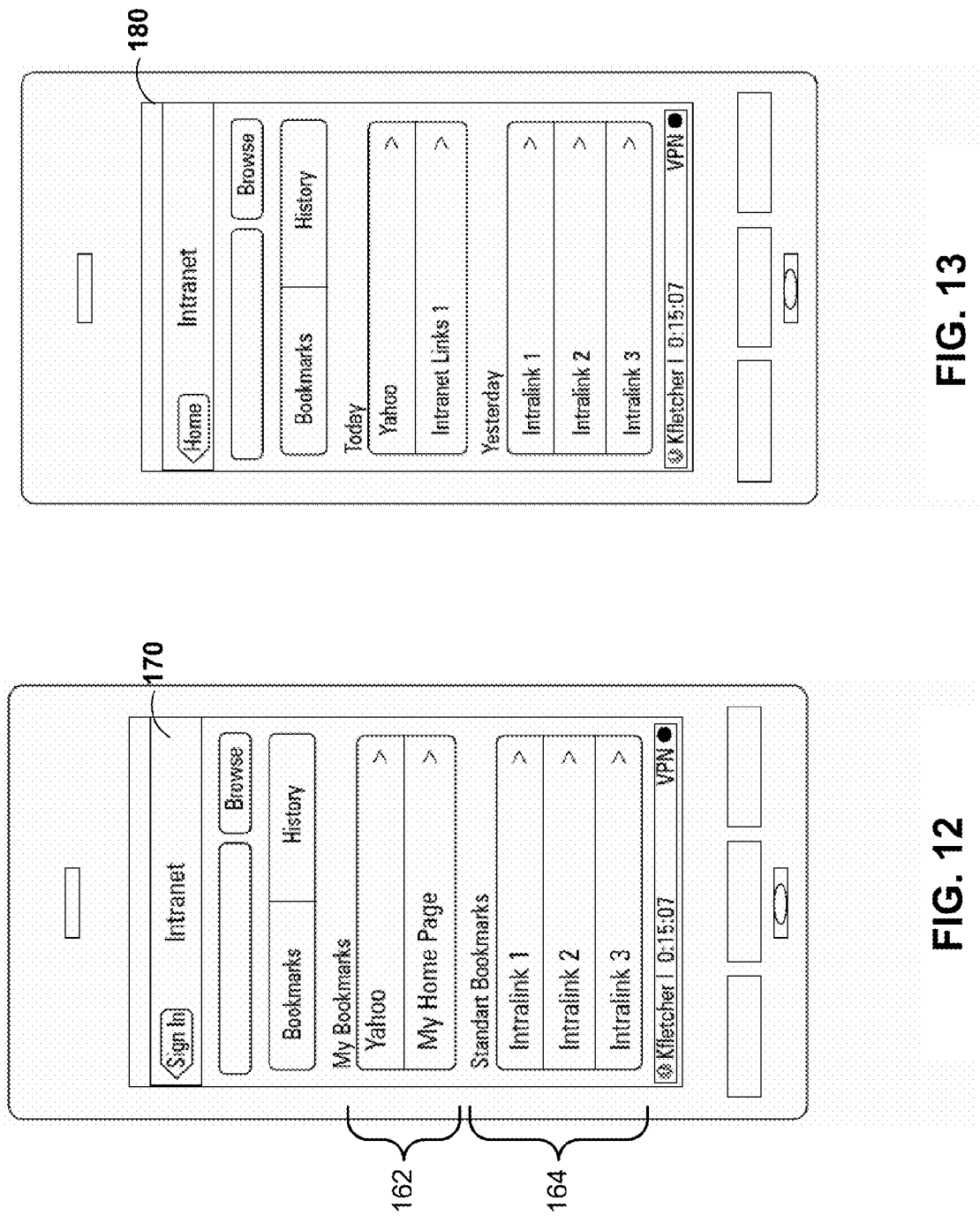

MULTI-SERVICE VPN NETWORK CLIENT FOR MOBILE DEVICE HAVING DYNAMIC FAILOVER

This application claims the benefit of U.S. Provisional Patent Application 61/398,758 filed Jun. 30, 2010, the entire content of which is incorporated herein by reference.

TECHNICAL FIELD

The invention relates to cellular networks and, more particularly, to cellular-based network data services.

BACKGROUND

Use of cellular mobile devices for accessing computer data networks has recently increased dramatically. These mobile devices, often referred to as "smart" phones, provide a platform for both cellular phone calls and cellular-based access to computer data services. For example, a typical cellular radio access network is a collection of cells that each include base stations capable of transmitting and relaying radio signals to subscribers' mobile devices. A "cell" generally denotes a distinct area of a cellular network that utilizes a particular frequency or range of frequencies for transmission of data. A typical base station is a tower to which are affixed a number of antennas that transmit and receive the data over the particular frequency. Mobile devices may transmit radio signals at the designated frequency to the base stations to initiate cellular telephone calls or packet-based data services.

With respect to data services, cellular service providers convert the cellular signals, e.g., Time Division Multiple Access (TDMA) signals, Orthogonal Frequency-Division Multiplexing (OFDM) signals or Code Division Multiple Access (CDMA) signals, received from mobile devices at the base stations into Internet protocol (IP) packets for transmission within packet-based networks.

The ubiquitous use of cellular mobile devices and the ever increasing desire by users for fast, secure network access from around the world has presented many challenges for enterprises. Enabling even basic connectivity across all desired cellular mobile device platforms can be a huge challenge. Enabling secure connectivity with an easy end-user experience can be even more challenging. For example, the dramatic increase in use of cellular mobile devices for computer data services has exposed service providers and enterprise networks to increased security risks presented by misconfigured devices. Because users often lack technical experience, endpoint devices, including cellular mobile devices, often become misconfigured. That is, users may accidentally install viruses, spyware, or other software that can potentially damage the functionality of the endpoint device or compromise the security of the computer network to which the endpoint is coupled. Once affected, endpoint devices can inadvertently spread malicious software to the servers and possibly to other endpoint devices. As numerous different endpoint security and connectivity software applications are added to each end user mobile device, the potential for problems and network conflicts increases. It is currently very difficult for information technology (IT) staff to enable network connectivity for users from any device, at any time, from virtually anywhere, without requiring significant end-user interaction with complex technologies.

SUMMARY

In general, an integrated, multi-service network client for cellular mobile devices is described. For example, techniques are described by which a single software package can be easily deployed on mobile network devices to provide integrated secure enterprise virtual private network (VPN) connectivity, network acceleration, security management including monitored and enforced endpoint compliance, and collaboration services. The integrated, multi-service client may be deployed as a single package downloadable from a standard application ("app") deployment mechanism, such as an electronic store or other repository for user applications, provided by a manufacturer of a mobile device.

Once installed on the cellular mobile device, the multi-service client integrates with an operating system of the device so as to provide a single entry point for user authentication for secure enterprise connectivity, endpoint security services including endpoint compliance with respect to anti-virus and spyware software, acceleration, and comprehensive integrity checks. The multi-service client provides a common user interface to the integrated services, and provides a VPN handler that operates as the entry point for network traffic to which the integrated services are to be applied. The multi-service client allows enterprise and service provider IT staff to reduce the number of software agents required and installed on employee devices, thus minimizing potential software conflicts and reducing deployment costs. Further, if additional software, add-ons, or other capabilities are required for a connection, the multi-service network client may automatically download and installs those components without any end user or administrator interaction.

In this way, the multi-service network client described herein may integrate several services into one, comprehensive, multi-service client, thus simplifying maintenance, administration, and deployment of network clients. Enterprises may no longer have to deal with separately managed and administered agents. Moreover, the techniques may simplify end user experience and reduce help desk time and administrative expense.

In one embodiment, a cellular mobile device comprises a transmitter and receiver to send and receive cellular communications in the form of radio frequency signals, a microprocessor, and an operating system executing on the microprocessor to provide an operating environment of application software. The cellular mobile device includes a multi-service network client downloaded to the cellular mobile device and registered with the operating system as a single application. The multi-service network client comprises a virtual private network (VPN) handler to establish a VPN connection with a remote VPN security device upon authenticating a user to the remove security device, wherein the VPN handler encrypts output network packets and decrypts inbound network packets to securely tunnel the network packets between the cellular mobile device and the remote VPN security device. The multi-service network client further includes a security manager to receive the decrypted inbound network packets from the VPN handler and apply at least one security service to the decrypted network packets, and a VPN control application that provides a unified user interface that allows a user to configure both the VPN handler and the security manager. The VPN handler establishes the VPN connection to concurrently include both a layer three (L3) tunnel that uses a first type of transport layer protocol of the operating system and a layer four (L4) tunnel that uses a second type of transport layer protocol of the operating system. The VPN handler determines whether network ports associated with the L3 tunnel are unblocked by the operating system and, when the network ports are unblocked, automatically transitions from the L4 tunnel to the L3 tunnel without terminating the VPN connection.

In another embodiment, a method comprises receiving, with a cellular mobile device from an electronic repository, a single distribution software package that includes a multi-service network client, wherein the multi-service network client includes a virtual private network (VPN) handler, a security manager; and a VPN control application that provides a unified user interface that allows a user to configure both the VPN handler and the security manager. The method further comprises installing the multi-service network client on the cellular mobile device including registering the VPN handler with an operating system of the cellular mobile device, wherein the VPN handler provides a single point of entry for network packets from the operating system to apply VPN services with the VPN handler and security services with the security manager; and establishing, with the VPN handler, the VPN connection to concurrently include both a layer three (L3) tunnel that uses a first type of transport layer protocol of the operating system and a layer four (L4) tunnel that uses a second type of transport layer protocol of the operating system. The method further comprises determining, with the VPN handler, whether network ports associated with the L3 tunnel are unblocked by the operating system and, when the network ports are unblocked by the operating system, automatically transitioning from the L4 tunnel to the L3 tunnel with the VPN handler without terminating the VPN connection The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 5-14 are schematic diagrams illustrating a front view of one embodiment of a cellular mobile device and show a number of displays presented by the multi-service network client deployed on the cellular mobile device.

DETAILED DESCRIPTION

Figure 1:
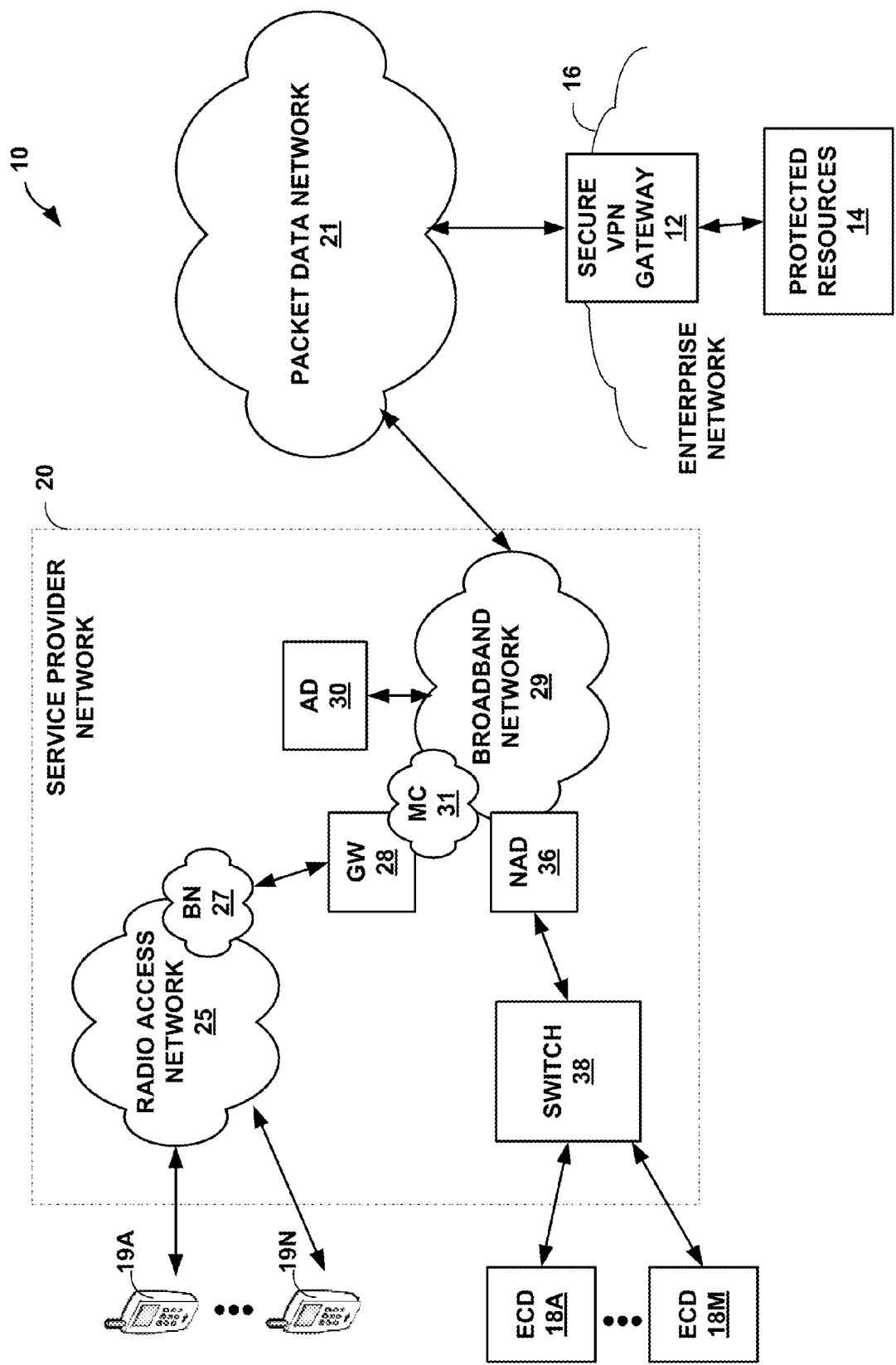
FIG. 1 is a block diagram illustrating an example system in which a secure VPN gateway of an enterprise provides secure access to protected resources of an enterprise network for both endpoint computing devices and cellular mobile devices.

FIG. 1 is a block diagram illustrating an example system 10 in which secure VPN gateway 12 provides secure access to protected resources 14 of enterprise network 16. That is, secure VPN gateway 12 enables secure and controlled access to resources provided by enterprise network 16. For example, endpoint computing devices ("ECDs") 18A-18M and cellular mobile devices 19A-18N remotely access enterprise network 16 via service provider network 20 and an intermediate packet data network 21, such as the Internet.

In one example, secure VPN gateway 12 is a secure sockets layer VPN (SSL VPN) device that provides VPN services to clients. Further details on SSL VPN appliances and operations are found in "Juniper Networks Secure Access Administration Guide, Release 6.5," Juniper Networks, Inc., 2008, which is incorporated herein by reference in its entirety. Secure VPN gateway 12 may be a standalone appliance or may be hosted on one or more other devices, such as an intrusion detection and prevention (IDP) system, a firewall, a unified threat management (UTM) device, a router, or other network device.

Enterprise network 16 provides access to sensitive data and services that are accessible only to certain authorized users of the enterprise. The users may access enterprise network 16 by authentication to secure VPN gateway 12 and establishing a communication channel through service provider network 20. In this way, enterprise administrators may use secure VPN gateway 12 to discriminate access to enterprise network 16 by individual employees based on employee authorization. In this way, system 10 enables remote access to protected resources 14 of enterprise network 16. Each of protected resources 14 may be, for instance, a web server, an application server, a database server, a file server, an application, an employee workstation, a native messaging or email client, or other electronic resource.

In this example, endpoint computing devices 18 may be personal computers, laptop computers or other type of computing device associated with individual employees or other authorized users. In contrast, cellular mobile devices 19 provide a platform for both cellular phone calls and cellular-based access to computer data services. That is, each of mobile devices 19 is a wireless communication device capable of cellular communications. Mobile devices 19 may comprise, for example, a mobile telephone, a laptop or desktop computer having, e.g., a 3G wireless card, a wireless-capable netbook, a video game device, a pager, a smart phone, or a personal data assistant (PDA). Each of mobile devices 19 may run one or more applications, such as mobile calls, video games, videoconferencing, and email, among others.

Service provider network 20 also provides network access, data transport and other services to mobile devices 19. Service provider network 20 includes radio access network 25 in which one or more base stations communicate via radio signals with mobile devices 19. Backhaul network ("BN") 27 is a transport network that enables base stations of radio access network to exchange packetized data with mobile core network 31 of the service provider, ultimately for communication with broadband network 29 and packet data network 21. Backhaul network 27 typically comprises communication nodes interconnected by communication links, such as leased land-lines or point-to-point microwave connection. The communication nodes comprise network, aggregation, and switching elements that execute one or more protocols to route packets between base stations and gateway device ("GW") 28 of mobile core network 31. In various aspects, backhaul network 27 may comprise a GSM radio access network (GRAN) or a Universal Mobile Telephony Service (UMTS) terrestrial radio access network (UTRAN) operating according to respective radio access network standards set forth by the relevant standards-setting body (e.g., 3GPP).

Mobile core network 31 provides session management, mobility management, and transport services between backhaul network 27 and broadband network 29 to support access, by mobile devices 19, to packet data network 21 and services of protected resources 14. Mobile core network 31 may comprise, for instance, a general packet radio service (GPRS) core packed-switched network, a GPRS core circuit-switched network, an IP-based mobile multimedia core network, or another type of transport network. Mobile core network 7 comprises one or more packet processing nodes to support firewall, load balancing, billing, deep-packet inspection (DPI), and other services for mobile traffic traversing the mobile core network.

In the example of FIG. 1, endpoint computing devices 18 connect to network access device 36 via network switch 38. In one embodiment, network switch 38 may comprise digital subscriber line access multiplexers (DSLAMs) or other switching device. Each of endpoint computing devices 18 may utilize a Point-to-Point Protocol (PPP), such as PPP over ATM or PPP over Ethernet (PPPoE), to communicate with network switch 38. For example, using PPP, one of endpoint computing devices 18 may request access to broadband network 29 and provide login information, such as a username and password, for authentication by authentication device ("AD") 30. PPP may be supported on lines such as digital subscriber lines (DSLs) that connect endpoint computing devices 18 with network switch 38. In other embodiments, endpoint computing devices 18 may utilize a non-PPP protocol to communicate with network switch 38. Other embodiments may use other lines besides DSL lines, such as Ethernet over a T1, T3 or other access link.

Network switch 38 may communicate with network access device 36 over a physical interface supporting various protocols, e.g., ATM interface supporting ATM protocols. Network access device 36 typically includes Broadband Remote Access Server (BRAS) functionality to aggregate output from switches into a higher-speed uplink to broadband network 29. In some embodiments, network access device 36 may comprise a router that maintains routing information between endpoint computing devices 18 and broadband network 29.

Secure VPN gateway 12 intermediates access by endpoint computing devices 18 and mobile devices 19 to protected resources 14. In one example, secure VPN gateway 12 terminates incoming access requests and connections at the application layer of the Open System Interconnection (OSI) reference model or of the TCP/IP model. In this example, secure VPN gateway 12 operates as an application-layer proxy to protect protected resources 14 from direct exposure to packet data network 21. Secure VPN gateway 12 receives incoming access requests encapsulated in a packet, decapsulates the access requests to reach the underlying application data, and sends the application data comprising the access requests to requested protected resources 14.

In another example, secure VPN gateway 12 allows direct connections between layers of the OSI reference model or of the TCP/IP model. In this example, secure VPN gateway 12 exchanges data using a secure channel negotiated with the requesting one of endpoint computing devices 18 or mobile devices 19. Secure VPN gateway 12 receives a secure request via the secure channel and makes requests to the appropriate one of protected resources 14 on behalf of the requesting client to establish a data connection between the requesting device and the requested protected resource 14.

To access protected resources 14 within enterprise network 16, an endpoint computing device 18 or a mobile device 19 establishes a data connection to secure VPN gateway 12. Each of the data connections may comprise, for example, a secure data connection conforming to a security scheme, such as Secure Sockets Layer (SSL) or Internet Protocol Security (IPSec) protocols. That is, an SSL VPN may be used to tunnel IP packets on top of a Layer 4 connection oriented protocol, e.g., Transmission Control Protocol (TCP). Alternatively, an IPSec VPN may be established to tunnel encrypted IP packets, i.e., Encapsulation Security Payload (ESP) packets, on top of a connection-less protocol, e.g., IP or User Datagram Protocol (UDP).

In either case, secure VPN gateway 12 may require user credentials to establish authentication and authorization. Credentials may include, for example, a username-password pair, a biometric identifier, a data stored on a smart card, a one-time password token or a digital certificate. Based on the provided credentials, secure VPN gateway 12 authorizes or denies access to enterprise network 16. Secure VPN gateway 12 may use an authentication, authorization and accounting (AAA) server to authenticate the credentials. The AAA server may execute on secure VPN gateway 12 or on a separate network device and may be, for example, a Remote Authentication Dial-In User Service (RADIUS) server. Secure VPN gateway 12 and the remote device may also negotiate other aspects of data connection 14 that ensure security, including the type/version of an encryption algorithm, and symmetric keys for encrypting/decryption data transported via data connection 14.

When accessing enterprise network 16, a user associated with one of endpoint computing devices 18 may direct a web browser executing on the endpoint computing device to an address Uniform Resource Locator (URL) associated with the enterprise. In this case, secure VPN gateway 12 presents a web page on the endpoint computing device via the web browser to capture the credentials required from the user.

Figure 2:
FIG. 2 shows an example login web page presented to the user via the web browser when accessing the secure VPN gateway via an endpoint computing device.

FIG. 2 shows an example login web page presented to the user via the web browser when accessing secure VPN gateway 12 via an endpoint computing device 18. Upon proper authentication, secure VPN gateway 12 presents a default user home web page on the endpoint computing device via the web browser.

Figure 3:
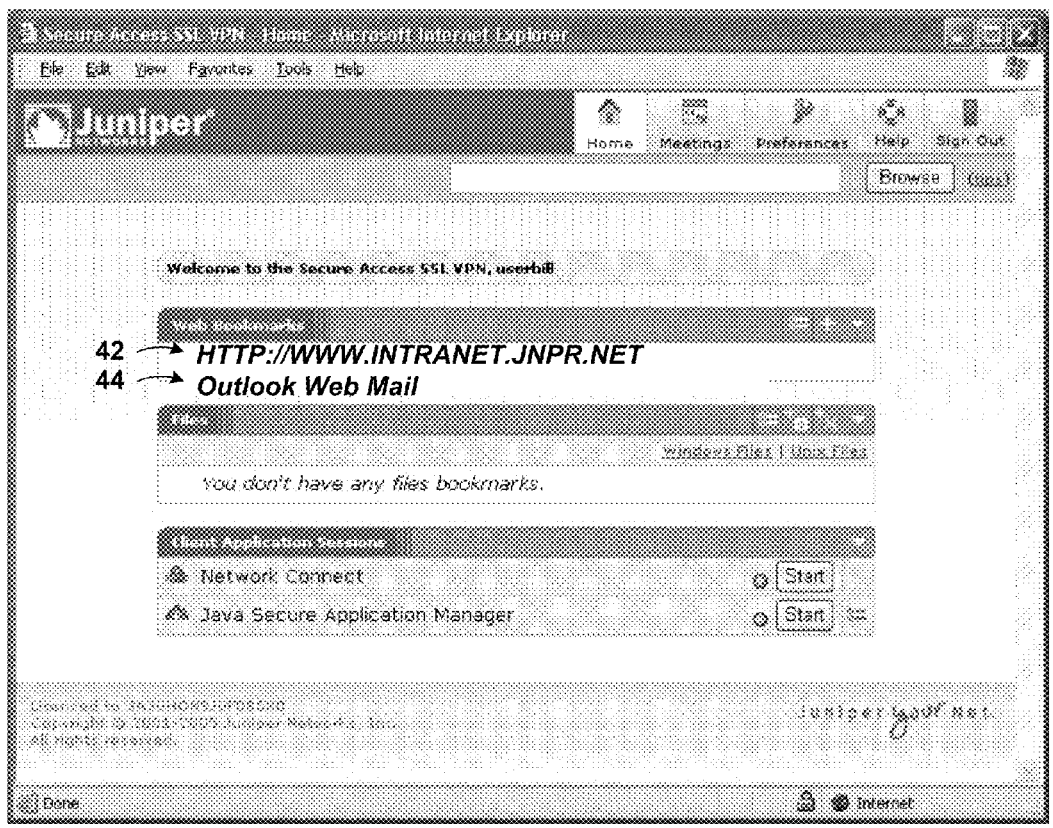
FIG. 3 shows an example user home web page presented to the user via the web browser when accessing the secure VPN gateway via an endpoint computing device.

FIG. 3 shows an example user home web page presented to the user via the web browser when accessing secure VPN gateway 12 via an endpoint computing device 18. As shown in FIG. 3, the web page presents a list of bookmarks that allow the user to easily navigate protected resources 14 using HTTP links. In this example, FIG. 3 shows a first link 42 to an intranet file server provided by the enterprise and a second link 44 to enterprise web mail for the user.

As described herein, cellular mobile devices 19 each include a multi-service network client that, among other services, allows secure VPN connection to easily be provisioned and established over radio access network 25 of service provider network 20. Other applications running on mobile devices 19 may utilize the VPN connections to access services offered by protected resources 14. That is, cellular mobile devices 19 and secure VPN gateway 12 provide secure VPN services to applications running on the mobile device. In one example, each mobile device 19 includes a secure access application that provides integrated, anytime/anywhere connectivity, acceleration, and security in a manner that simplifies user experience. For example, upon downloading the secure access application, users of mobile devices 19 may no longer need to interact with network access and security software. From any location, users simply supply their credentials and the secure access application interacts with secure VPN gateway 12 to handle all provisioning and deployment. As such, the secure access software on mobile devices 19 enables fast, easy, secure access to corporate networked and cloud-based data and applications from mobile devices and smart phones. Enterprises and service providers can deploy granular role and device-based security policies when provisioning mobile handset access. In one example, the secure access software on mobile devices 19 provides a single, unified client for VPN remote access, WAN acceleration, and endpoint compliance. The secure access software may eliminate the expense and administrative burden of deploying, configuring, and maintaining separate clients. In some cases, the secure access software on mobile devices 19 may use location-aware intelligent session migration to deliver accelerated, secure, anytime/anywhere network and application access automatically. For example, the software may seamlessly migrate from one access method to another based on the user's location, and accelerates secure access to network resources based on user identity and role.

Figure 4A:
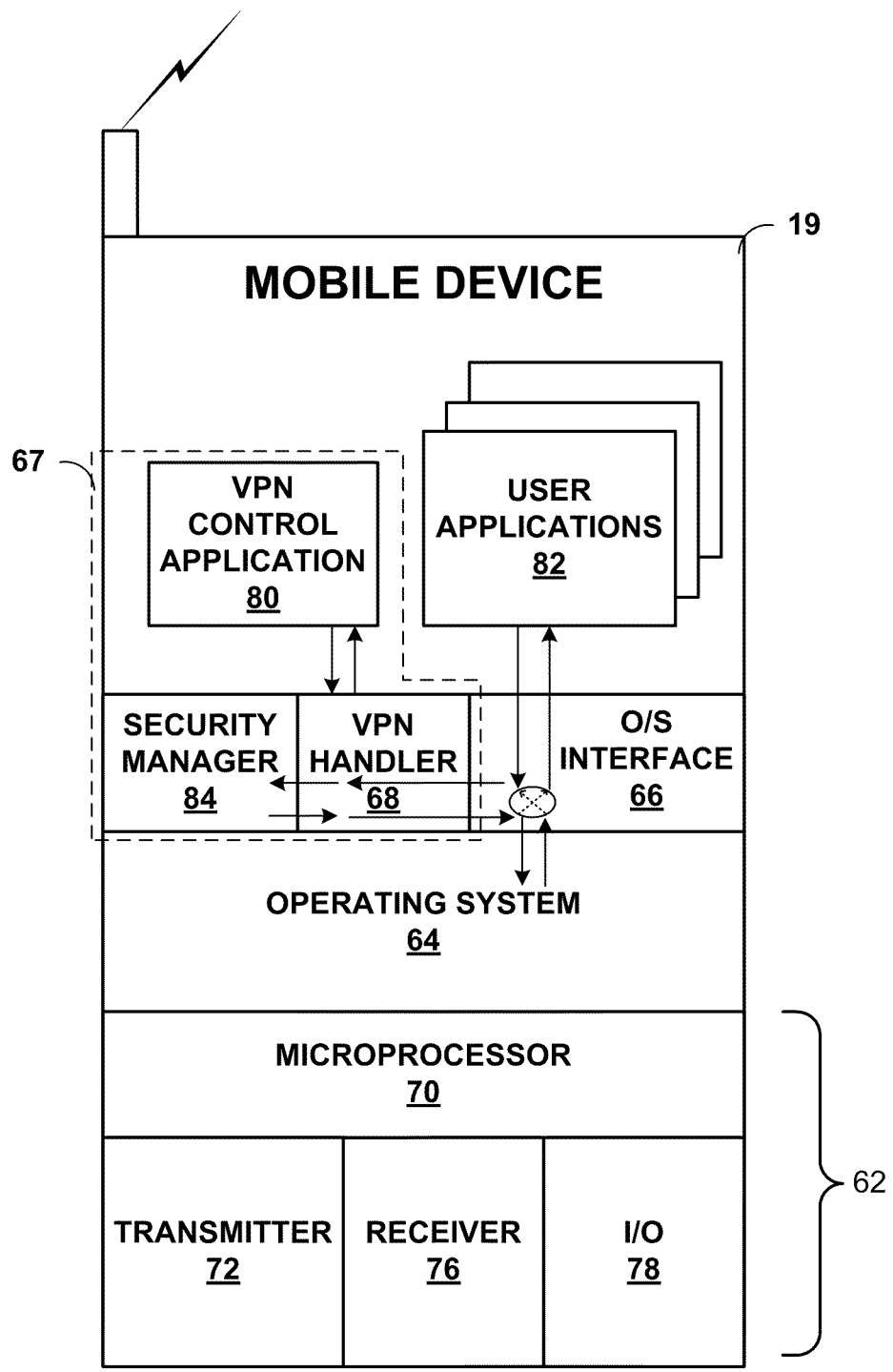
FIG. 4A is a block diagram of an example embodiment of a cellular mobile device having a multi-service network client in accordance with the techniques described herein.

FIG. 4A is a block diagram of an example embodiment of mobile device 19 that operates in accordance with the techniques described herein. In this example, mobile device 19 includes a hardware 62 that provides core functionality for operation of the device. Hardware 62 may include one or more programmable microprocessors 70 configured to operate according to executable instructions (i.e., program code), typically stored in a computer-readable medium such as static, random-access memory (SRAM) device or Flash memory device. Transmitter 72 and receiver 74 communicate with other communication devices via a wireless communication, such as high-frequency radio frequency (RF) signals. Hardware 62 may include additional discrete digital logic or analog circuitry.

Operating system 64 executes on microprocessor 70 and provides an operating environment for one or more applications (commonly referred to "apps"). O/S interface 66 proves an interface layer of software capable of making kernel calls into operating system 64. In other words, O/S interface 66 provides a framework within which VPN handler 68 operates and may, for example, allow VPN handler 68 to execute within a "user" space of the operating environment provided by mobile device 19. O/S interface 66 may allow other forms of protocol handlers to be "plugged in" for interfacing with operating system 64. O/S interface 66 interacts with operating system 64 to provide OS-level support for protocol-specific handlers. O/S interface 66 may, for example, provide access to lower levels of the OSI stack for routing packets to and from the VPN connection, ensuring DNS resolvers are set correctly for the VPN, and the like. As shown in FIG. 4A, O/S interface 66 routes inbound low-level packets and outbound application-layer communications to VPN handler 68 for processing. At this time, VPN handler 68 registers with operating system 64 to provides a single point of entry for network traffic so as to transparently apply VPN services and security services without requiring registration of multiple agents with operating system 64 or separate administration of those agents.

In some cases, executable code for VPN handler 68, VPN control application 80 and security manager 84 may be distributed as a single distribution package 67 that is downloadable from a standard "app" deployment mechanism, such as provided by a server associated with an electronic store or other repository for user applications, provided by a manufacturer of mobile device 19. That is, VPN handler 68, VPN control application 80 and security manager 84 may be integrated into a multi-service client for mobile device 19 to allow easy deployment. An application management utility on the cellular mobile device may, for example, issue a request to the server and, in response receive distribution package for processing and installation on the mobile device.

VPN handler 68 provides all low-level communication handling for access to enterprise network 16 via secure VPN gateway 12. For example, VPN handler 68 handles interaction and authentication to VPN gateway 12, establishment and deconstructing of a secure data connection conforming to a security scheme, such as SSL or IPSec protocols, and the formation of encrypted outbound packets to be tunneled and the processing of inbound packets to decrypt those packets received from the tunnel. In one embodiment, VPN handler 68 supports both SSL and IPSec protocols and, as described in further detail below, may intelligently and dynamically switch between the two depending upon the state of the VPN connection to VPN gateway 12.

VPN control application 80 provides user interface by which a user is able to configure and manage VPN handler 68 as well as other services integrated within the multi-service client, including security manager 84. For example, VPN control application 80 allows a user to submit credentials and instruct VPN handler 68 to dynamically instantiate a secure VPN connection with secure VPN gateway 12 or deconstruct an existing VPN connection.

In one embodiment, VPN control application 80 provides an interface that translates communications with secure VPN gateway 12 such that the information typically available to the user over a web browser (e.g., FIGS. 2 and 3 described above), are dynamically rendered in a user interface presentable in native format on mobile device 19. In other words, in this example, VPN control application 80 may dynamically parse HTML links and other information from Hypertext Transfer Protocol Secure (HTTPS) responses from secure VPN gateway 12 and render a window suitable for display on mobile device 19 using input mechanisms (e.g., icons, radio buttons) native to the device.

Upon creation of a secure VPN connection with secure VPN gateway 12, the user can interact directly with the U/I of VPN handler 68 as if the user where accessing his or her default web page normally presented by VPN gateway 12 via an HTML web page. For example, the user may interact with VPN handler 68 to select icons that have been dynamically constructed to correspond to the HTML bookmarks of the user's home web page. The user can, for example, engage an input button corresponding to an administrator-defined link 44 to access web mail as if the user was using a web browser. However, instead of viewing the mail via a web browser when accessing VPN gateway 12 via an endpoint computing device 18, VPN handler 68 may launch an email application provided by, and thus native to, mobile device 19 as if the email bookmark with the web-based home page were selected by the user.

In addition to using VPN handler 68, the user is able to launch other applications 82 that may be deployed on mobile device 19 for accessing protected resources 14 over the VPN connection. In this case, VPN handler 68 receives application-layer data from user applications 82 that has been redirected to the VPN handler via O/S interface 66. VPN handler 68 encapsulates the application-layer data to secure packets for tunneling over the VPN connection, and returns the secure packets to operating system 64 for output via transmitter 72 via radio signals. VPN handler 68 receives inbound packets from operating system 64 that are associated with the VPN connection, processes the secure packets to extract and reform application-layer data, and passes the application-layer data to user applications 82. In this way, VPN handler 68 may be used as a single point of entry for secure enterprise access from mobile devices and endpoint computing devices alike without requiring separate support for different types of applications.

In one embodiment, VPN handler 68 maintains the VPN connection even after the VPN control application 80 quits. Thus, VPN control application 80 need not be active to allow other user applications 82 to utilize the tunnel. VPN handler 68 may be configured to automatically tear down the VPN connection in the event mobile device 19 is put to sleep. When mobile device 19 wakes up, VPN handler 68 automatically brings the VPN connection to an active state. In some cases, VPN handler 68 monitors the amount of traffic flow on the VPN connection so as to detect idle VPN connections and automatically disconnect the VPN connection after a user-configurable amount of idle time.

In some embodiments, VPN handler 68 registers a pre-defined, custom URL format with operating system 64. When other user applications 82 invoke O/S interface 66 directly to "launch" a URL that conforms to these special formats, operating system 64 automatically launches the application that registered the URL format. In one example, VPN handler 68 registers a custom URL format with the following form:

junospulse://<server-host>/<server-path>?method={vpn}&action={start|stop}&DSID=<dsid-cookie>&SMSESSION=<smsession-cookie>.

When this URL is "launched" by another application 82, operating system 64 loads VPN handler 68, if necessary, and invokes the VPN handler with a call-back function that passes in the specific URL. At this point, VPN handler 68 determines whether a VPN connection is already established. If a VPN tunnel is not currently established and the doConnect flag is '1' then VPN handler 68 automatically determines whether a VPN profile exists with a URL that matches the URL received from operating system 64. If not, then VPN handler 68 automatically creates a new VPN profile with the passed-in URL. If session cookies are specified in the launch URL received from operating system 64, VPN handler 68 establishes the new VPN tunnel with the given session cookies. If there are no session cookies specified in the launch URL, VPN handler 68 accesses secure VPN gateway 12 in normal course and the user is taken through the normal login process. If VPN handler 68 confirms that a VPN tunnel is already established and the "redirectOnConnected" of the launch URL is set to '1', VPN handler 68 may redirect execution to a web browser application or other default one of applications 82 and exit without tearing down the tunnel.

Security module 84 is a software thread provided by the multi-service client that, when installed, is continuously executed in the background by operation system 64 to provide certain security functions for mobile device 19. As one example, security manager 84 may provide anti-virus and spyware detection functions for mobile device, and VPN handler 68 transparently shunts traffic to the security module for application of the security services. VPN control application 80 may provide a user interface for configuring anti-virus settings, personal firewall settings and other parameters associated with of the security module 84.

Furthermore, in accordance with the techniques described herein, VPN handler 68 registers with security manager 84, and the security manager provides up-to-date security information to the VPN handler. Moreover, VPN handler 68 may locally require active, registered anti-virus and spyware software and up-to-date virus definitions before allowing a VPN connection to be established with VPN gateway 12. This local enforcement may be controlled by policies received from VPN gateway 12 during the login and authentication process.

In some embodiments, VPN handler 68 incorporate a "host checker" module that inventories a state of mobile device 19, builds a health status report and passes the health status report to VPN gateway 12 at the time of login for processing and determination as to whether mobile device 19 is compliant with corporate policies. For example, VPN handler 86 may collect and forward up-to-date "health information" to VPN gateway 12 at the time establishment of the VPN connection is requested. In general, the term "health information" is used herein to generally refer to data that describes a security state of mobile device 19. For example, the health information may describe whether the specific mobile device contains potentially malicious software (e.g. a known virus or spyware), whether the endpoint device has invalid configuration, or whether approved countermeasures (e.g., anti-virus software) have been properly installed on the endpoint device. In some cases, VPN gateway 12 may prevent access or allow limited access based on both the current health information of mobile device 19 and the particular user that is requesting the VPN connection. Further details of such techniques for controlling access based on health information of a mobile device can be found in U.S. patent application Ser. No. 11/236,987, Filed Sep. 28, 2005, entitled "NETWORK DEFENSE SYSTEM UTILIZING ENDPOINT HEALTH INDICATORS AND USER IDENTITY," the entire contents of which are incorporated herein by reference.

Although deployed as a single package 67, VPN handler 68 and VPN control application 80 are configured such that they may be independently upgraded. For example, the user may be able to upgrade both VPN handler 68 and VPN control application 80 via retrieving the latest distribution package 67 from the electronic repository for user applications provided by the manufacturer of mobile device 19. In addition, the VPN handler may be programmed so as to automatically upgrade itself upon establishing a connection to a secure VPN gateway 12 in the event a newer version exists for the VPN handler and the secure VPN gateway that has been configured to require that the mobile device has the newest version of the handler. In this case, the new version of VPN handler 68 will be downloaded directly from the secure VPN gateway 12 or a server associated with the VPN gateway.

In some cases, VPN control application 80 is programmed such that when the user launches the VPN control application for the first time, the VPN control application prompts the user with a security warning asking if he or she wishes to enable SSL-VPN functionality. This can be a useful security precaution to prevent malicious software from silently installing VPN software without the user's knowledge. If the user declines, VPN control application 80 may display a splash screen until the user quits the application. If the user accepts, the decision is recorded until the device's memory is wiped.

Figure 4B:
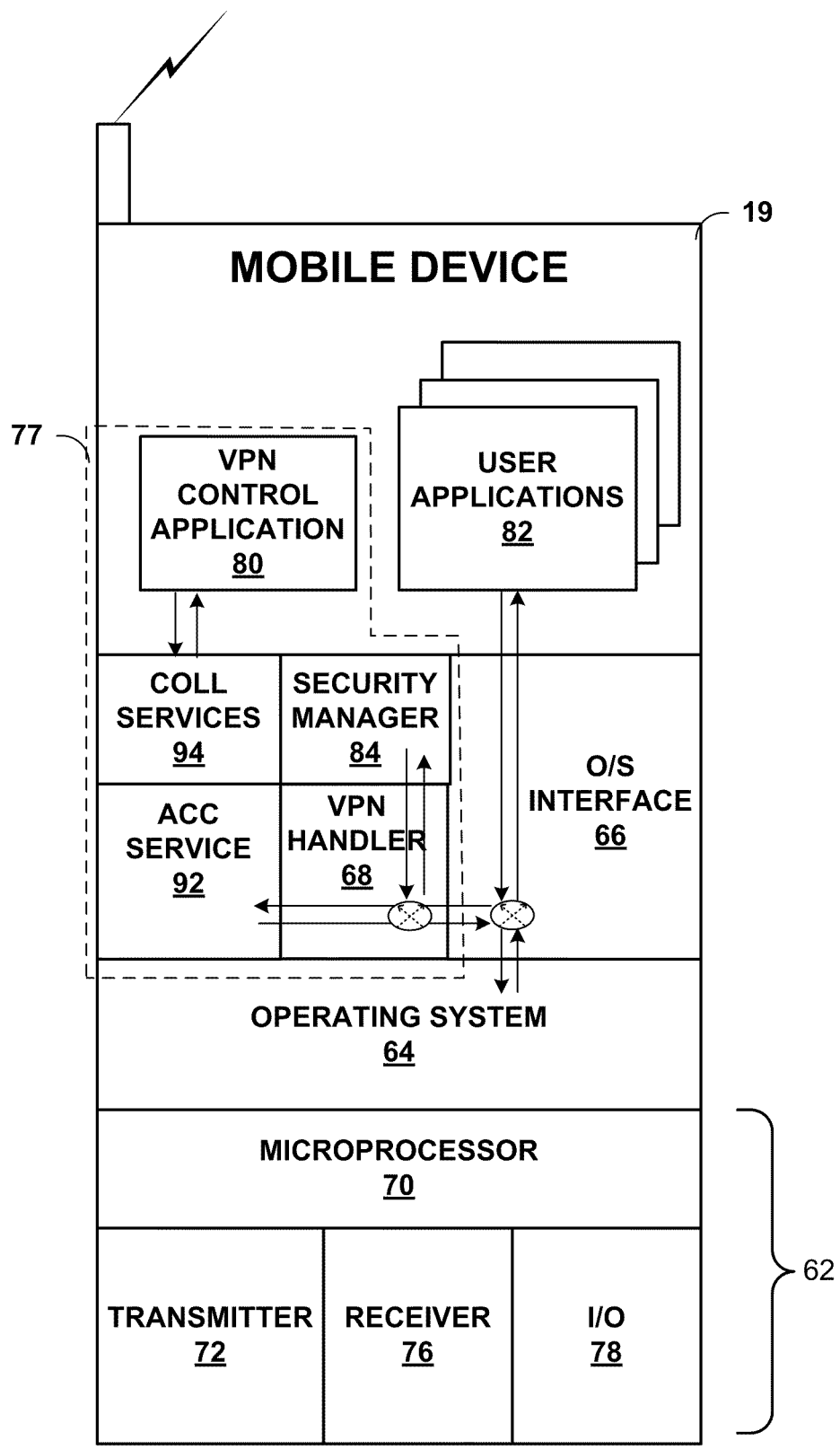
FIG. 4B is a block diagram of a second example embodiment of a cellular mobile device a multi-service network client in accordance with the techniques described herein.

FIG. 4B is a block diagram of a second example embodiment of mobile device 19 that operates in accordance with the techniques described herein. In this example, mobile device 19 includes a distribution package 77 that provides a multi-service network client having VPN handler 68, VPN control application 80, security manager 84, acceleration service 92, and collaboration services 94. The multi-service network client may be distributed as a single distribution package 77 from a standard "app" deployment mechanism provided by a manufacturer of mobile device 19. In this way, distribution package 77 provides an integrated, multi-service VPN client like distribution package 67 of FIG. 4A. In this example, similarly numbered components function as described with respect to FIG. 4B.

Acceleration service 92 of the multi-service network client provides integrated data acceleration services for mobile device 19 and may utilize a number of different acceleration techniques. VPN control application 80 provides a unified user interface that allows a user to configure both VPN handler 68 and the acceleration service 92.

As a first example, acceleration service 92 may be configured to provide a local, small-footprint content cache. In this case, acceleration service 92 may cache content received in response to requests previously issued by VPN control application 80 or user applications 82 and retrieved from enterprise network 16 or, more generally, public data network 21. VPN handler 68 may, for example, intercept HTTP or HTTPS get requests and query acceleration service 92 to determine if the requested network content is cached locally before encapsulating the requests in the VPN tunnel and issuing the request to O/S interface 66 for output to secure VPN gateway 12. If the content is not cached, VPN handler 68 tunnels the request to secure VPN gateway 12 in normal course and, upon receiving a response, updates the local content cache. VPN handler 68 utilizes the content cache to service subsequent requests. In addition, acceleration service may be configured to interact with upstream caches provided by the service provider or the enterprise. In this manner, acceleration service 92 may increase the overall efficiency of downloading content from secure VPN gateway 12 or otherwise.

As a second example, acceleration service 92 may be configured to provide a client-side decompression service that operates in conjunction with an upstream acceleration device that provides real-time, continuous pattern recognition and compression of data flows. For example, an upstream acceleration device may employ pattern recognition and an efficient compression algorithm that is capable of detecting and eliminating repeated phrases of variable length to provide continuous acceleration of a data stream. Acceleration service 92 may maintain a phrase dictionary that is synchronized with a phrase dictionary of the upstream device, and may utilize the phrase dictionary to rebuilt compressed data streams from the upstream compression device. In this way, transmission acceleration may be provided all the way to mobile device 19, including over the wireless transmission medium, without requiring standalone downstream wan acceleration devices. Further exemplary details of continuous data compression using synchronized upstream and downstream devices are described in U.S. Pat. No. 6,856,651, Amit P. Singh, entitled "SYSTEM AND METHOD FOR INCREMENTAL AND CONTINUOUS DATA COMPRESSION," filed May 30, 2001, the entire contents of which are incorporated herein by reference.

As a third example, acceleration service 92 may be configured to provide transparent application-specific protocol optimization to improve transfer efficiencies for mobile device 19.

In some deployments, acceleration service 92 may be used with data flows associated between mobile device 19 and the remote enterprise network. For example, acceleration service 92 may operate as a client-side component that leverages server-side wan acceleration services deployed within secure VPN gateway 12 or within other acceleration devices of enterprise network 16. However, use of acceleration service 92 is not limited to enterprise VPN environments. For example, as further discussed with respect to FIG. 4C, acceleration service 92 may be used in conjunction with acceleration devices deployed within service provider network 20 for data flows that do not pass through the VPN connection.

Collaboration components 94 provide an integrated package of collaborative applications that can be used in conjunction with any VPN connection established by VPN handler 68 or in a non-enterprise environment. As one example, collaboration components may provide software for network meetings, secure desktops, document sharing or other software that may aid the user in collaborating with others.

Figure 4C:
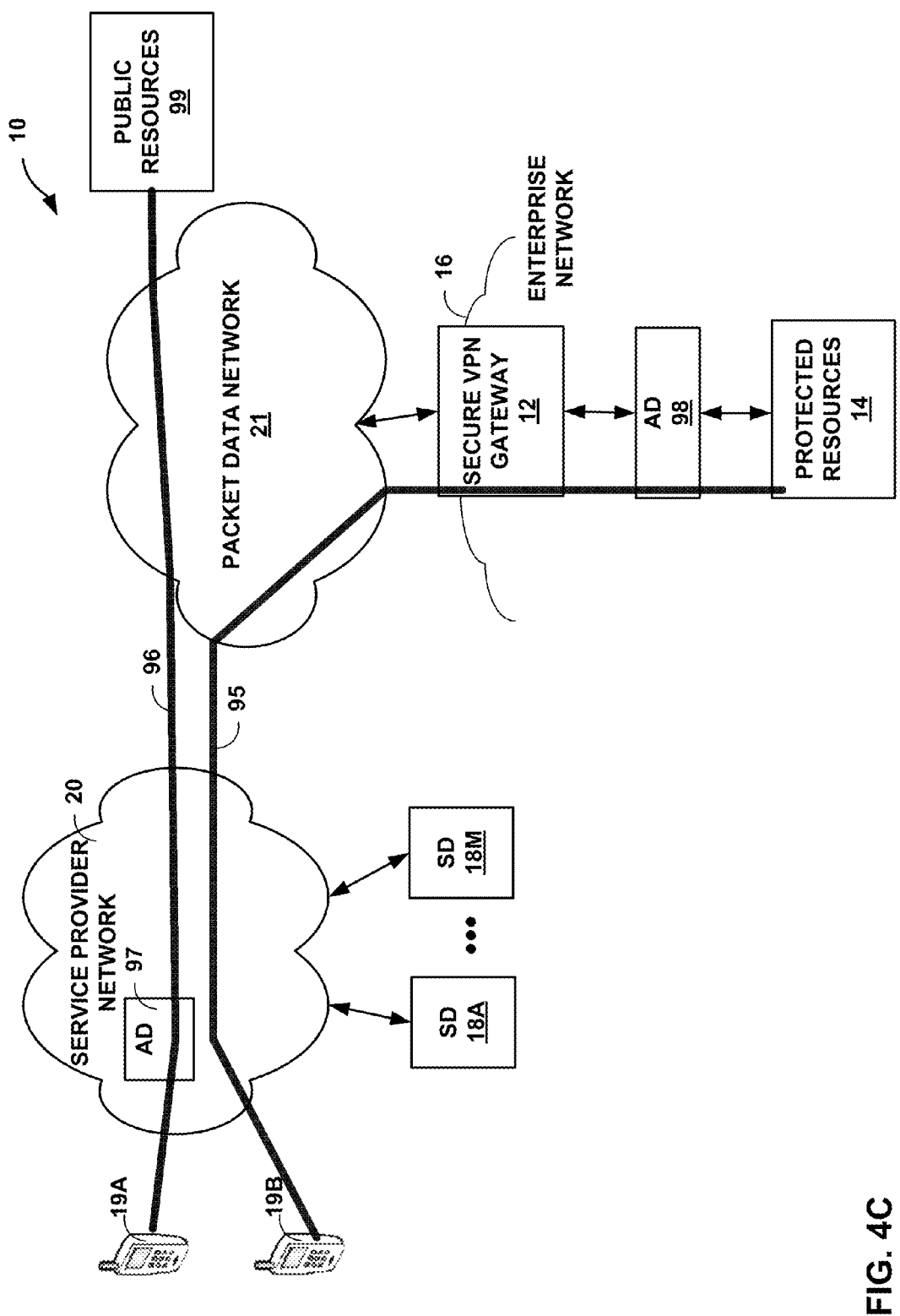
FIG. 4C is another block diagram of the computing system of FIG. 1 and shows the example mobile devices utilizing multi-service network client for both enterprise connectivity and non-enterprise connectivity.

FIG. 4C is another block diagram of system 10 (FIG. 1) and shows the multi-service network client described herein deployed to two mobile devices 19A and 19B. In this example, each of mobile devices 19A, 19B include distribution package 77 of FIG. 4B, and each have an integrated network client that provides a VPN handler, a VPN control application, a security manager, an acceleration service, and collaboration services.

In the example of FIG. 4C, VPN handler 68 executing on mobile device 19B has established VPN connection 95 with secure VPN gateway 112 of enterprise network 16 in accordance with the techniques described herein. Moreover, the VPN handler transparently invokes the integrated acceleration service 92 to provide compression and acceleration services for VPN connection 95. Further, as shown in FIG. 4C, the acceleration service of mobile device 19B operates in concert with upstream acceleration device 98 of enterprise network 16 to provide for pattern recognition for WAN acceleration.

Further, in this example, mobile device 19A is utilized without an enterprise network and, in particular, without establishing a VPN connection with a remote secure VPN gateway. In this case, the VPN handler of the multi-service network client operates as a transparent front-end for distributing packet flows to the acceleration service, security manager, and collaborative services that are integrated within distribution package 77 without providing VPN tunneling services for data flows 96. That is, the VPN handler need not establish a VPN connection nor provide encryption/decryption services to the packet flows, but nevertheless seamlessly applies the other integrated services to data flows 96 between mobile device 19A and public resources 99 accessible via packet data network 21, such as the Internet. For example, as shown in FIG. 4C, the VPN handler executing on mobile device 19A still receives and send packets to an O/S interface and, at this time, seamlessly routes the packets through the integrated acceleration service (such as acceleration service 92 of FIG. 4B) to provide compression and acceleration services for data flows 96. Further, as shown in FIG. 4C, the acceleration service of mobile device 19A operates in concert with upstream acceleration device 97 of service provider network 20 to provide for pattern recognition for WAN acceleration. In addition, the acceleration service may provide a content cache, file compression and other services. Similarly, the VPN client of mobile device 19A integrates with the security manager of the distribution package to provide anti-virus and spyware detection functions for mobile device. For example, even though the VPN handler operates as a transparent pass-through without tunneling packets through a VPN connection, the VPN handler of mobile device 19A may locally require active, registered anti-virus and spyware software and up-to-date virus definitions before allowing packets to be communicated to service provider network 20 via data flows 96.

In this way, a user of a mobile device may deploy and utilize the multi-service network client described herein either as an enterprise solution, as strictly a consumer application without enterprise VPN connectivity, or both. In either case, the VPN control application provides a unified user interface and the internal VPN handler may be used to provide a front-end for routing inbound and outbound packets through the other services, such as acceleration and security regardless of whether the VPN handler is configured to establish a VPN connection and tunnel the packets through the VPN connection. Further, the executables associated with the multi-service VPN client may be similar or even identical for the different deployments, with certain functionality disabled for the non-enterprise deployment. This may allow a user to convert the multi-service VPN client from a non-enterprise deployment to an enterprise deployment and full VPN functionality by merely entering a key or authentication code without requiring installation of addition executable software.

Figures 5, 6:
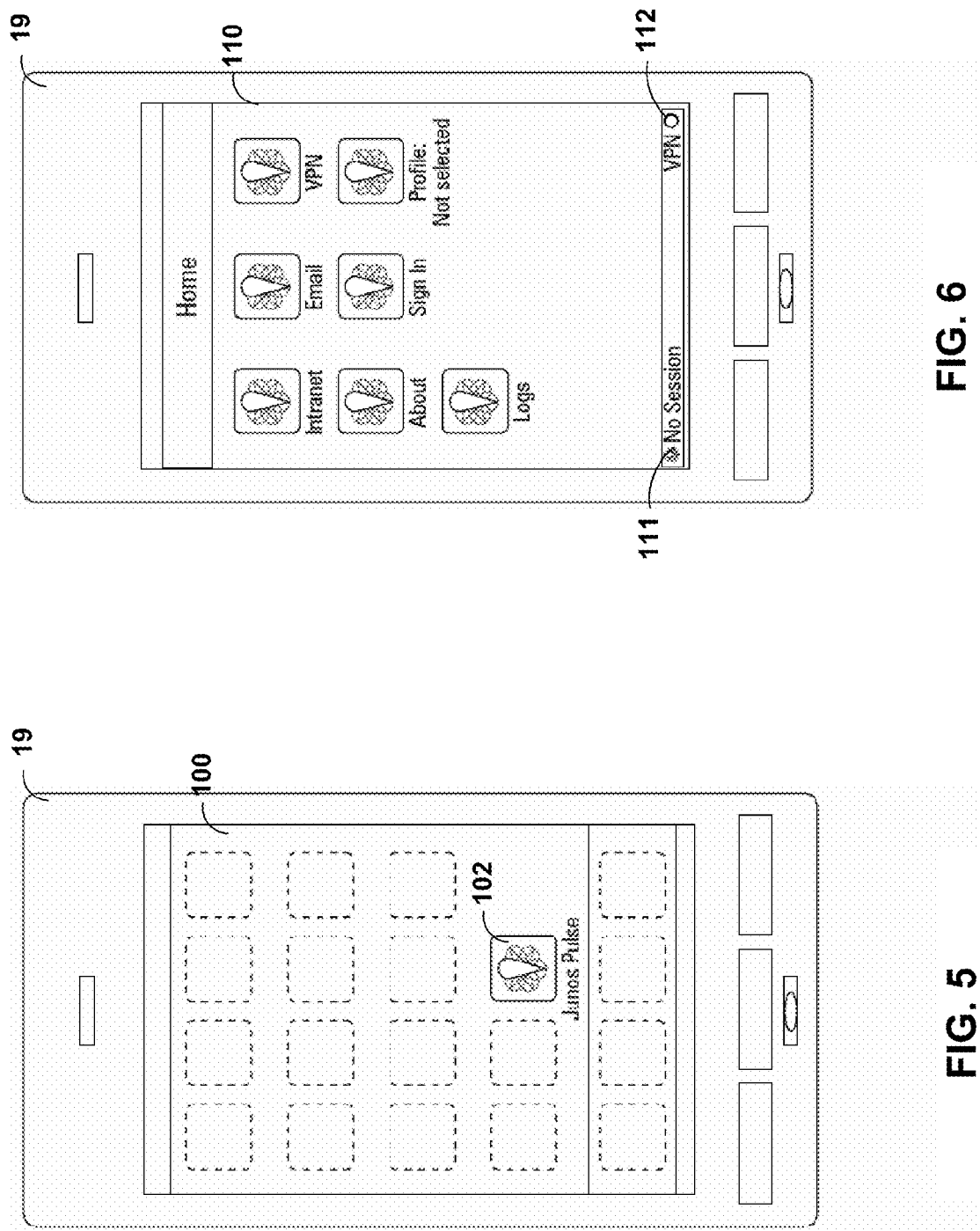

FIG. 5 is a schematic diagram illustrating a front view of one embodiment of mobile device 19. In this example, mobile phone includes a touch screen for presenting an interactive display 100 having a plurality of icons, each corresponding to a different user-launchable application. In this case, display 100 includes an icon 102 with which a user interacts to launch VPN control application 80.

FIG. 6 illustrates display 110 presented by VPN control application 80 once launched. In this example, display 110 is presented in the native format of mobile device 19 and, in the example embodiment, is not a web page. As shown in FIG. 1, display 110 as a Home window for the user that includes seven icons that provide quick access for the user to common functions, including an icon for accessing the enterprise intranet, an icon for accessing email, an icon for managing the VPN connection, an icon for signing into the enterprise, an icon for setting a current user profile, an icon for viewing related logs and an icon for viewing "About" information for the VPN handler. In the case of FIG. 6, no current profile has been selected for the user and no VPN session has been created. That is, before they can connect, the user must select a server to which connect. When VPN control application 80 is launched for the first time no server will be selected. VPN control application 80 allows the user to define profiles and, for each profile, specify an address for target server or security appliance (e.g., secure VPN gateway 12) for the profile. In addition, display 110 includes a status bar 111 and an indicator light 112 that represents the status of whether any VPN connection has been established FIG. 7A illustrates display 120 presented by VPN control application 80 when the user elects to manage and ultimately select a user profile. In this example, display 120 lists two profiles (Test Profile, and Corporate Profile) and includes an input mechanism 122 that allows the user to create a new user profile.

FIG. 7B illustrates display 125 presented by VPN control application 80 when the user selects input mechanism 122 (FIG. 7A) and creates a new user profile. In this example, the user is able to enter a profile name and a URL or address associated with the target enterprise. In some cases the user may also select a particular digital certificate from a list of certificates installed on mobile device 19. VPN handler 68 uses the selected certificate for user authentication when establishing the VPN connection with secure VPN gateway 12 associated with the specified address or URL.

FIG. 8A illustrates display 130 presented by VPN control application 80 after the user has created and selected a user profile, i.e., Acme Gizmo, Inc., for quick VPN access. At this time, the user has not yet signed in and a VPN connection has not yet been established. Display 130 presents a Sign In icon for one-click initiation of the sign-in process.

FIG. 8B illustrates display 135 presented by VPN control application 80 after the user has selected the Sign In icon of Home display 110 (FIG. 6) to initiate the sign-in process using the Acme Gizmo, Inc. profile. In response, VPN handler 68 has initiated communication with secure VPN gateway 12 via HTTPS, which returns an HTML-based login page. In some cases, VPN control application 80 specifies a specific HTTP user agent in the HTTPS request during the login phase to signal to VPN gateway 12 that the requesting device is a mobile device, thereby allowing VPN gateway 12 to select customized web-pages for the device. VPN control application 80 parses data from the returned HTML source code and renders display 135 within the native display of mobile device 19 to present authentication input mechanisms.

FIG. 9A illustrates display 137 presented by VPN control application 80 after VPN handler 68 has successfully authenticated the user logged into the enterprise and established the VPN connection with VPN gateway 12. In this case, the administrator has defined a plurality of different roles for the user. Moreover, each of the roles may be allow access to a specific set of protected resources 14. To further increase security, the administrator may configure secure VPN gateway 12 to present all or only an identified subset of the user's roles to the user when VPN access is being made through mobile device 19, which may be more readily stolen and compromised versus a home computer. In addition, the administrator may be able to further refine the set of roles available to the user based on position information received from mobile device 19 at the time the VPN connection is established, where the position information my comprise GPS coordinates of the mobile device, cell information identify a current cell, or a combination thereof. For example, secure VPN gateway 12 may allow the administrator to define certain geographic regions and assign those geographic regions a level of trust. In addition, the administrator may specify a required level of trust for a role to be made available to a user over the VPN connection, and the required level of trust can be specified on a per-user basis. From the overall roles for the user, secure VPN gateway 12 constructs a set of roles to be presented to the user by mobile device 19. Secure VPN gateway 12 may determine the set, for example, based on a level of trust assigned by the administrator for the geographic region in which mobile device 19 is currently positioned as well as any user-specific threshold level of trust assigned by the administrator that must be met before a given role is available for the particular user when using a mobile device. For example, the administrator may specify a level of trust of '5' (e.g., full trust) for the United States and '3' (moderate trust) for a second geographic region that the administrator or enterprise policies deems more likely of a security risk. In addition, the administrator may assign a required level of '5' to an "administrator role." As such, those users eligible for the "administrator role" may be presented with such an option when accessing secure VPN gateway 12 within mobile device 19 from within the United States but not when accessing the secure VPN gateway from the second geographic region.

FIG. 9B illustrates display 140 presented by VPN control application 80 as the Home after authentication and establishment of the VPN connection with VPN gateway 12. As such, indicator 112 is rendered to show the connectivity state, and status bar 111 shows the user name and the elapsed connection time. In addition, the Sign In icon has been replaced with a Sign Out icon that allows the user to terminate the VPN connection.

FIG. 10 illustrates a display 150 presented by VPN control application 80 when the user has selected the Sign Out icon from the Home screen. Once selected, the user is returned to the home screen and prompted for confirmation.

FIG. 11 illustrates display 160 presented by VPN control application 80 after the user has selected the VPN icon from Home display 110 (FIG. 6). As shown, display 150 presents certain configuration parameters for the establishment of the VPN, such as whether to automatically establish the VPN connection upon authenticating to the enterprise and receiving any session data. When automatic sign-in is disabled, VPN handler 68 does not create the VPN connection even though authentication has been completed. Instead, VPN handler 68 waits until application-layer data has been received from either VPN control application 80 or other user applications 82. In this way, fees and charges associated with data transfer over cellular data services may be reduced. In addition, the number of open session VPN gateway 12 is required to maintain and service may also be reduced.

Display 160 also presents current information associated with the VPN connection, including a current number of bytes sent and a current number of bytes received since the VPN connection was established. In addition, display 160 includes a Disconnect button that allows the user to terminate the VPN connection.

FIG. 12 illustrates display 170 presented by VPN control application 80 after the user has selected the Intranet icon from display 110 (FIG. 6). As shown, display 160 represents a translated version of the user's default home web page in a format that can be rendered by the VPN control application. Moreover, VPN control application 80 presents display 170 rather than the display being presented as a web page through a web browser installed on mobile device 19. When the user selects the Intranet icon from the native Home window of display 110, VPN control application 80 issues an HTTPS get request to retrieve the user's bookmark web page (FIG. 3) that would normally be presented as a full web page to the user if the user where accessing VPN gateway 12 via an endpoint computing device 18.

In this example, VPN control application 80 dynamically parses links and other bookmark information from the HTTPS response from secure VPN gateway 12 when accessing the home web page and dynamically builds a window for display 160 on mobile device 19. In this way, display 170 is built and presented as a display as part of VPN control application 80 and not as a web page of a separate web browser installed on mobile device 19. That is, VPN control application 80 dynamically constructs display 160 to include input controls that are native application controls provided by mobile device 19, where each of the input controls corresponds to a different bookmark parsed from the HTML response received from VPN gateway 12. As shown, VPN control application 80 has dynamically constructed display 160 to include a set of input controls 162 for the user-defined bookmarks and a second set of input controls 164 that correspond to the administrator-defined bookmarks of the user's default home web page (FIG. 3). Each of the bookmarks is represented by an input button graphic that is supported by the native display of mobile device 19. In response, VPN control application 80 formulates and outputs an appropriate HTTP string as if a corresponding HTML link were selected by the user. Thus, bookmarks 162, 164 are not web-based URLs as normally embedded in web pages, but operate as buttons on mobile device 19 and serve the purpose of pseudo-links within the context of the enterprise VPN. Example links that can be translated and rendered on mobile device 19 include links to local file servers, a link to an intranet file server, a link for a pre-configured remote desktop terminal session for the user that may run over the VPN connection.

In one example, VPN control application 80 includes an internal HTML parser and extraction of bookmark information is performed in real-time using combination of XPath queries on the HTML and processing logic on the set of elements returned by the XPath query. Further details on the XML Path Language (XPath) can be found in "XML Path Language (XPath)", Version 1.0, available from World Wide Web Consortium (W3C), Nov. 16, 1999, the entire content of which is incorporate herein by reference.

In one example, VPN control application 80 retrieves the bookmark web page by issuing a direct request for an index. cgi file for the particular VPN user. Next, VPN control application 80 parses the response from VPN gateway 12 with its internal HTML parser using the following search algorithm to extract the bookmarks' URLs and titles. First, in the HTML returned by index.cgi, VPN control application 80 issues XPath queries to locate all anchor elements with href attributes which contain "launch.cgi." In one example, this is achieved by the following XPath query: //a[contains(@href, 'launch.cgi')]. Next, on the set of elements returned by the above criteria, VPN control application 80 iterates over all children and extracts bookmark captions from the elements with simple string content.

The following is an example excerpt from HTML of index. cgi showing the code related to a single bookmark:

```
<table cellpadding="0" cellspacing="0" border="0" width="100%">
    <tr valign="top">
        <td>
            <table cellpadding="4" cellspacing="0" border="0" width="100%">
                <tr valign="top">
                    <td>
                        <a
href="/user/home/launch.cgi?url=.ahuvs%3A%2F%2FGiry66r6zEY15F.DHaPTsLZZ%2F
CO%2FPCBUSKWcqNaUU">
                            <img src="/dana-cached/imgs/icn18x18WebBookmark.gif"
alt="This bookmark will open in this window" width="18" height="18"
border="0">
                        </a>
                    </td>
                    <td width="100%">
                        <a
href="/user/home/launch.cgi?url=.ahuvs%3A%2F%2FGiry66r6zEY15F.DHaPTsLZZ%2F
CO%2FPCBUSKWcqNaUU">AcmeGizmo Intranet : Security Guidelines</a>
                        <br><span class="cssSmall">Sample Bookmark
description</span>
                    </td>
                </tr>
            </table>
        </td>
        <td align="right">
            <table cellpadding="0" cellspacing="0" border="0">
                <tr>
```

-continued

```
                <td colspan="6"><img src="/dana-cached/imgs/space.gif"
width="1" height="1"></td>
            </tr>
            <tr>
                <td bgcolor="#EEEEEE">
                    <a
href="/user/home/launch.cgi?url=.ahuvs%3A%2F%2FGiry66r6zEY15F.DHaPTsLZZ%2F
CO%2FPCBUSKWcqNaUU" target="_blank"
                            onclick='JavaScript:openBookmark(this.href, "yes",
"yes");return false;'>
                        <img src="/dana-cached/imgs/btnPanelPopWindow.gif"
alt="Open in a new window" title="Open in a new window" width="20"
height="20" border="0">
                    </a>
                </td>
                <td bgcolor="#CCCCCC"><img src="/dana-
cached/imgs/space.gif" width="1" height="1"></td>
                <td bgcolor="#EEEEEE">
                    <a href="/user/home/editbk.cgi?row=2&syncFlag=1"
title="Edit">
                        <img src="/dana-cached/imgs/btnPanelItemPrefs.gif"
alt="Item Properties" title="Item Properties" width="20" height="20"
border="0">
                    </a>
                </td>
                <td bgcolor="#EEEEEE">
                    <a
href="/user/home/panelpref.cgi?val=0&delete=1&type=web&xsauth=ec4a8685edbe
e9c2cbc9438de6c5066e&syncFlag=1" title="Edit">
                        <img src="/dana-cached/imgs/btnPanelItemDelete.gif"
alt="Delete bookmark" title="Delete bookmark" width="20" height="20"
border="0">
                    </a>
                </td>
                <td><img src="/dana-cached/imgs/space.gif" width="1"
height="1">
                </td>
            </tr>
        </table>
    </td>
</tr>
</table>
```

VPN control application 80 extracts the actual URL of each bookmark from the anchor href attribute. VPN control application 80 eliminates any duplicates which can occur due to icon links in the HTML.

Having found the anchor element for the bookmark, VPN control application 80 locates the corresponding description by getting all sibling elements of that anchor and finding the one which has simple string content. In the HTML example snippet given, this would be the <span> element with a content of "Sample Bookmark description".

VPN control application 80 is able to distinguish custom bookmarks based on the presence of the additional link for editing them. These links can be found enumerating the anchor items which have editbk.cgi in their href attribute. This can be done with the following XPath query: //a[contains (@href, 'editbk.cgi')]

For example, the following links may be extracted as bookmarks:

https://secure.acmegizmo.com/dana/home/launch.cgi?url=http%3A%2F%2Fintranet.acmegizmo.com https://secure.acmegizmo.com/dana/home/launch.cgi?url=http%3A%2F%2Fintranet.acmegizmo.com%2Fcgi-bin%2Fdbpro.cgi https://secure.acmegizmo.com/dana/home/launch.cgi?url=http%3A%2F%2Fagexchange3.acmegizmo.com%2Fexchange%2F https://secure.acmegizmo.com/dana/home/launch.cgi?url=http%3A%2F%2Fintranet.acmegizmo.com%2Fit%2Fsecurity.html Having only one anchor element containing editbk.cgi in href attribute, VPN control application 80 determines the first three are standard bookmarks and the last one is custom one set by the user.

When a user selects a bookmark from the native UI displayed by VPN control application 80, the VPN control application opened it is opened in an embedded browser control that is hidden from the user. The browser is navigated directly to the URL extracted for the given bookmark and may be presented to the user as a web page via a browser or may dynamically processed into the native display of mobile device 19.

In some case, VPN control application 80 looks for a specially configured bookmark with the following example name: "Mobile Webmail." If such a bookmark exists, the Email icon (FIG. 6) will launch a web-based email in a browser, opening the Mobile Webmail bookmark link. Alternatively, instead of launching a web browser, VPN handler 68 may launch a native email application provided by mobile device 19.

VPN control application 80 allows an administrator to define a custom page to be displayed instead of the standard bookmarks page. VPN control application 80 detects whether the bookmarks page has been returned by VPN gateway 12 or not. If a custom page is being opened as part of the standard flow, then VPN control application 80 displays this custom page in place dynamically constructing the native user interface for bookmarks.

FIG. 13 illustrates display 170 presented by VPN control application 80 after the user has toggled from the bookmark view (FIG. 12) to a view of a history of previously selected pseudo-links.

Figure 14:
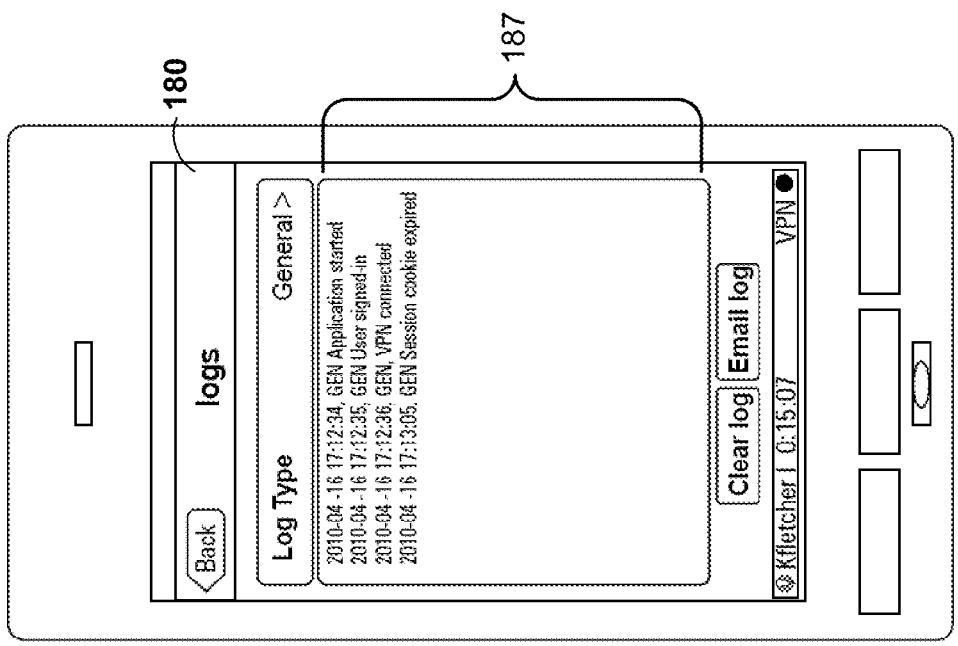

FIG. 14 illustrates display 185 presented by VPN control application 80 after the user has selected the LOGS icon from display 110 (FIG. 6). As shown, display 185 presents a transaction window 187 for listing activity related to the VPN connection including date and time stamps for each action. In some cases, VPN control application 80 may also provide input mechanisms that allow the user to upload the log to secure VPN gateway 12 or automatically attaching them to email for emailing them to an administrative email address specified by secure VPN gateway 12. This may provide an easy and efficient mechanism by which the user can obtain assistance with setting up the VPN connection on his or her mobile device 19.

In some embodiments, VPN handler 68 may utilize a form of compression when communicating with VPN gateway 12 over the VPN tunnel. That is, VPN handler 68 may compress the application-layer data within the carried by the payloads of the tunneled packets. After compressing the data, VPN handler 68 encrypts and encapsulates the data to form secure packets for tunneling to VPN gateway 12. This allows VPN handler 68 to reduce the amount of bandwidth consumed by the VPN connection, which may be important in a mobile environment.

In one embodiment, VPN handler 68 includes algorithms for applying Lempel-Ziv (LZ) compression in conjunction with an IPSEC connection to tunnel encrypted IP packets, i.e., Encapsulation Security Payload (ESP) packets, on top of a connection-less protocol, e.g., IP or User Datagram Protocol (UDP), to VPN gateway 12. In this case, UDP is used as the transport layer for with use of LZ compression integrated with IPSEC for compressing and securing outbound tunneled packets and for decompressing inbound tunneled packets.

In some embodiment, VPN handler 68 supports both SSL and IPSec protocols is programmed to intelligently and dynamically switch between the two depending upon the state of the VPN connection to VPN gateway 12.

VPN handler 68 handles interaction and authentication to VPN gateway 12, establishment and deconstructing of a secure data connection conforming to a security scheme, such as SSL or IPSec protocols, and the formation of outbound packets to be tunneled and the processing of inbound packets received from the tunnel.

That is, in some cases, VPN handler 68 may establish an IPSec VPN to tunnel encrypted IP packets on top of a connection-less protocol, e.g., IP or User Datagram Protocol (UDP). In other cases, VPN handler 68 may use and SSL VPN to tunnel IP packets on top of a Layer 4 connection-oriented protocol, e.g., Transmission Control Protocol (TCP). That is, VPN handler 68 recognizes that TCP inherently introduces latency with SSL VPN tunnel relative to IP SEC over UDP, yet in some cases may provide connectivity through firewalls that typically recognize SSL packets but block UDP packets. For this reason, VPN handler 68 may be programmed to adaptively failover between an L3-based IPSEC network tunnel using UDP as a transport protocol and an L4-based SSL network tunnel that uses TCP as a transport.

For example, in some embodiment, VPN handler 68 may first establish the VPN connection ton include an SSL VPN tunnel by performing a key exchange with secure VPN gateway 12. In this case, VPN handler 68 may encapsulate initial application-layer data within a SSL encrypted packet stream flowing on through the SSL VPN tunnel between the mobile device 19 and the secure VPN gateway 12. Although an SSL VPN tunnel can operate in most remote network environments including firewalls and proxies, tunneling packets on top of the connection oriented TCP inherently introduces latency, complexity and potentially increased bandwidth, all of which may be of significant concern in a mobile environment. Therefore, VPN handler 68 may also establish a parallel IPSec VPN tunnel with secure VPN gateway 12 for the VPN connection while simultaneously sending the any initial data packets on SSL VPN tunnel. VPN handler 68 may send test messages, i.e., discovery packets, over the IPSEC VPN tunnel in parallel with sending data over the SSL VPN tunnel. If VPN handler 68 receives a reply to the test messages on IPSec VPN tunnel 62, VPN handler 68 stops sending data on the SSL VPN tunnel and instead automatically (e.g., without manual intervention) utilizes to IPSec VPN tunnel. At this point, VPN handler 68 may tear down the SSL VPN tunnel or, in many cases, may leave the SSL connection established. In this way, if the remote network environment changes and the data packets can no longer reach the corporate network on the IPSec VPN tunnel, VPN handler 68 automatically (e.g., without manual intervention) returns to the SSL VPN tunnel. In some embodiments, VPN handler 68 may use a single IP address assigned to mobile device 19 by secure VPN gateway 12 for the VPN for both of the tunnels and effectively dynamically change the type of transport layer protocol (e.g., TCP or UDP) of the operating system and the security service (e.g., IP SEC and SSL) applied to tunneled packets. In some embodiments, VPN handler 68 and secure VPN gateway 12 may operate in accordance with the techniques set forth in U.S. patent application Ser. No. 11/226,501, filed Sep. 14, 2005, entitled "ADAPTIVE FAILOVER BETWEEN LAYER THREE AND LAYER FOUR NETWORK TUNNELS," the entire contents of which are incorporated herein by reference.

In some cases, the adaptive transition between SSL and IPSEC VPN connections by VPN handler 68 may be particularly advantageous in mobile device 19 because, in some cases, operating system 64 may already be using UDP ports associated with IP SEC. In this case, an IPSEC VPN connection by a higher-level VPN handler 68 (e.g., a VPN handler executing in kernel mode) may have IP SEC communications consumed or otherwise blocked by operating system 64 since the operating system may incorrectly operate as if the IP SEC packets are to be processed by the operating system. In such cases, VPN handler 68 may establish the VPN connection and initially utilize SSL and automatically transition from an SSL tunnel with TCP transport (e.g., an L4 tunnel) to the an IPSEC tunnel with UDP transport (e.g., an L3 tunnel) without terminating the VPN connection only when the UDP network ports associated with the L3 tunnel are unblocked by the operating system. As such, the techniques described herein allow VPN handler 68 to be easily downloaded, installed and deployed on mobile device 19 without requiring user intervention as to the tunneling mechanism that is compatible with the lower-level operating system-level components of the mobile device.

Some embodiments of VPN handler 68 perform a fast reconnect in the event communication with secure VPN gateway 12 is temporarily lost. More specifically, establishes an SSL control channel by issuing an HTTPS request to secure VPN gateway 12. Upon a successful authentication, secure VPN gateway 12 provides a session cookie with a unique identifier that the secure VPN gateway maps to specific user information. This allows VPN handler 68 in the event the VPN connection is temporarily lost. This may be especially important on mobile devices due to constantly changing network conditions such as transition between base stations, switching between a wireless local area network ("WiFi") and cellular packet-based network connections, and power state transitions. In the event the status of the network connection has changed by mobile device 19, O/S interface 66 may set a semaphore or other signaling mechanism to signal the change. In response, VPN handler 68 issues another HTTPS request and includes the session cookie, which allows the VPN handler to re-establish the VPN connection with secure VPN gateway 12 without requiring the user repeat the typical authentication process. In some cases, VPN handler 68 determines which type of transport mechanism is available, WiFi or cellular, to mobile device 19. In the event only a cellular packet-based network connection is available and not the WiFi connection, VPN handler 68 may selectively defer fast reconnect even though a valid, unexpired session cookie exists on mobile device 19. In particular, VPN handler 68 may defer fast reconnect until application-layer data is received from user applications 82. In some cases, VPN handler 68 defers fast VPN reconnect until receiving another event from O/S interface 66 indicating that network traffic is pending or has been initiated by user applications 82. In this way, VPN handler 68 may potentially reduce user fees associated with minutes or bandwidth consumption for data services that may arise with an established yet idle VPN connection.

Figure 15:
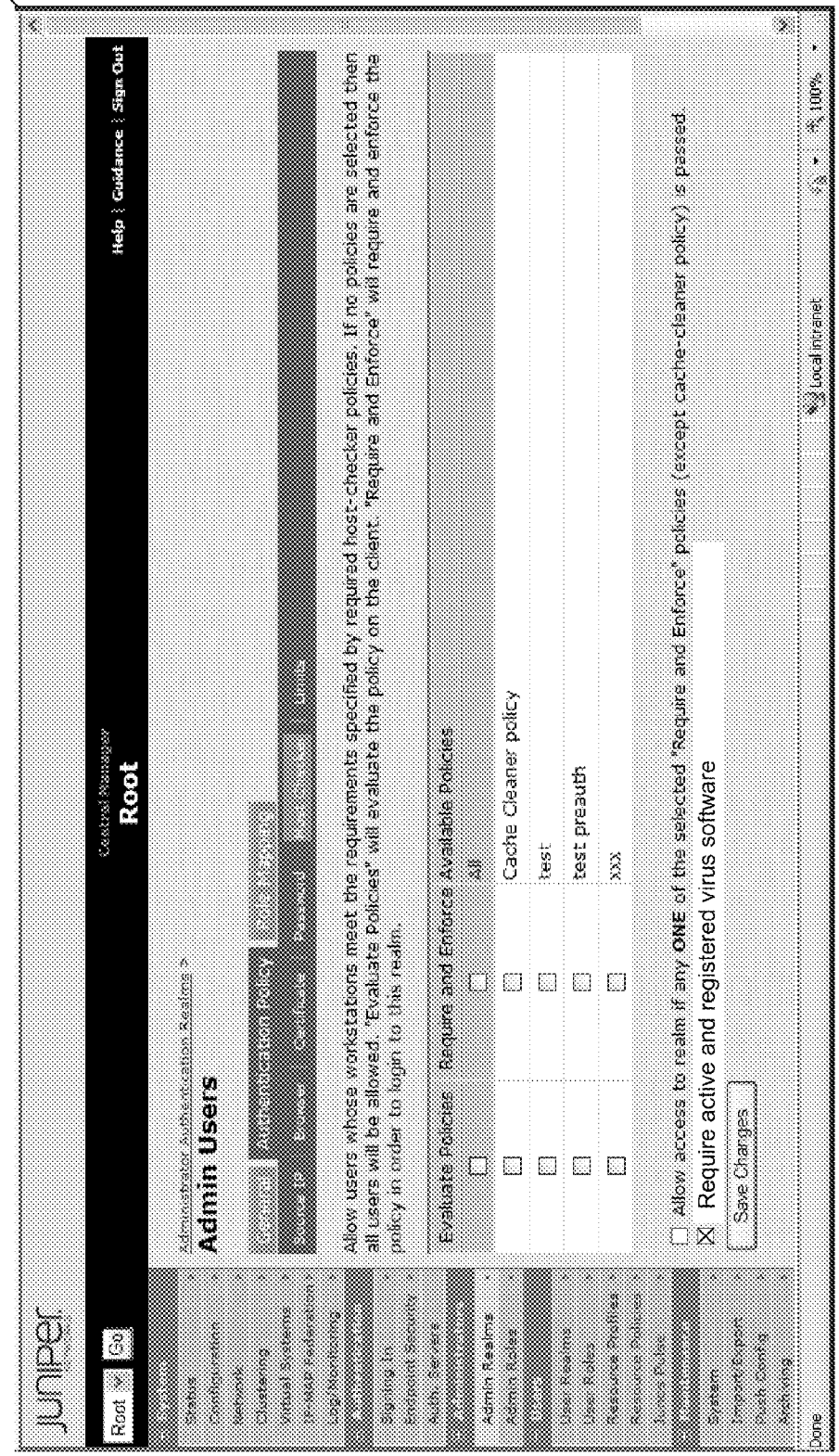
FIG. 15 is an example user interface 190 presented by secure VPN gateway.

FIG. 15 is an example user interface 190 presented by secure VPN gateway 12 by which an administrator is able to provide a variety of configuration parameters for administering secure access to endpoint computing devices 18 and cellular mobile devices 19. In particular, user interface 190 allows the administrator to enter configuration data with respect to endpoint compliance functions and host checker functions As shown in FIG. 16, user interface 190 includes a check box input control 192 by which an administrator is able to specify a host checker requirement related to security manager 84. That is, the administrator is able to specify that a pre-requisite to authorizing secure access to the enterprise is that the health status report generated by the integrated host checker functions of the multi-service client for the mobile device 19 must indicate that anti-virus and spyware software for security manager 84 are registered, enabled and up-to-date. In not, secure VPN gateway may deny access or provide quarantined access to limited resources required to download any out-of-date security component to mobile device 19.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:
1. A cellular mobile device comprising:
a transmitter and receiver to send and receive cellular communications in the form of radio frequency signals;
a microprocessor;
an operating system executing on the microprocessor to provide an operating environment of application software;
a multi-service network client downloaded to the cellular mobile device and registered with the operating system as a single application, wherein the multi-service network client comprises:
a virtual private network (VPN) handler to establish a VPN connection with a remote VPN security device upon authenticating a user to the remove security device, wherein the VPN handler encrypts output network packets and decrypts inbound network packets to securely tunnel the network packets between the cellular mobile device and the remote VPN security device;
a security manager to receive the decrypted inbound network packets from the VPN handler and apply at least one security service to the decrypted network packets; and
a VPN control application that provides a unified user interface that allows a user to configure both the VPN handler and the security manager,
wherein the VPN handler establishes the VPN connection to concurrently include both a layer three (L3) tunnel that uses a first type of transport layer protocol of the operating system and a layer four (L4) tunnel that uses a second type of transport layer protocol of the operating system, and
wherein, after establishing the L3 tunnel and prior to sending data on the L3 tunnel, the VPN handler determines whether network ports associated with the L3 tunnel are unblocked by the operating system and, when the network ports are unblocked, automatically transitions from the L4 tunnel to the L3 tunnel without terminating the VPN connection.

2. The cellular mobile device of claim 1, wherein the first type of transport layer protocol is a connection-less transport protocol and the second type of transport layer protocol is a connection-oriented transport protocol.

3. The cellular mobile device of claim 1,
wherein the VPN handler sends initial data packets of the VPN connection on the L4 tunnel and, after establishing the L3 tunnel and prior to sending data on the L3 tunnel, sends a discovery packet over the L3 tunnel to determine whether network ports associated with the L3 tunnel are unblocked by the operating system, and
wherein the VPN handler automatically transitions from the L4 tunnel to the L3 tunnel when a reply to the discovery packet is received.

4. The cellular mobile device of claim 1,
wherein the multi-service network client comprises a single distribution package, and
wherein the VPN control application presents a unified user interface for configuring anti-virus settings and personal firewall settings of the security manager.

5. The cellular mobile device of claim 1,
wherein the VPN handler comprises a host checker module that inventories a state of the cellular mobile device and builds a health status report, and
wherein the host checker outputs the health status report to the remote VPN security device prior to establishing the VPN connection for determining whether the cellular mobile device is compliant with corporate policies.

6. The cellular mobile device of claim 1, wherein the multi-service network client further comprises a data acceleration module that applies at least one acceleration service to the network packets from the VPN handler.

7. The cellular mobile device of claim 6, wherein the data acceleration module provides a local content cache.

8. The cellular mobile device of claim 6, wherein the data acceleration module provides a client-side decompression service that operates in conjunction with an upstream acceleration device to provide real-time, continuous pattern recognition and compression of data flows within the network packets.

9. The cellular mobile device of claim 6, wherein the data acceleration module provides application-specific protocol optimization for control flows within the network packets.

10. The cellular mobile device of claim 1, wherein the multi-service network client further comprises one or more collaboration components that process the packets from the VPN handler, wherein collaboration components provide collaboration services including at least one of a network meeting, a secure desktop or a document sharing service.

11. The cellular mobile device of claim 1,
wherein the VPN control application provides a user interface that allows a user to disable VPN connectivity, and
wherein, when VPN connectivity is disabled, the VPN handler exchanges the network packets with the operating system and transparently provides the packets to the security manager for application of the security service.

12. The cellular mobile device of claim 1, wherein the user interface of the VPN control applications allows the user to submit credentials and instruct the VPN handler to dynamically instantiate the secure VPN connection or deconstruct an existing VPN connection.

13. The cellular mobile device of claim 1,
wherein, upon establishing the VPN connection, the VPN control application receives a web-based home page from the secure VPN device via an Hypertext Transfer Protocol Secure (HTTPS) response,
wherein the VPN control application dynamically parses HyperText Markup Language (HTML) bookmark links from the HTTPS response and renders a bookmark window using input controls native to the cellular mobile device, where each of the input controls corresponds to a different one of the bookmark links parsed from the HTML response received from the secure VPN gateway, and
wherein, upon selection of one of the input controls, the VPN control application formulates and outputs an appropriate HTTP string to the secure VPN device as if a corresponding HTML link were selected by the user.

14. The cellular mobile device of claim 13,
wherein the VPN control application detects a bookmark within the HTML response corresponding to a webmail for the user, and
wherein, upon detecting the bookmark for the webmail, the VPN control application dynamically constructs the user interface to have an input control for launching a native email client of the cellular mobile device to access the webmail without launching a web browser.

15. The cellular mobile device of claim 1, wherein the VPN handler and the VPN control application are configured to be independently upgradable.

16. The cellular mobile device of claim 1,
wherein the VPN handler establishes the VPN connection as an Internet Protocol Security (IPSec) connection over User Datagram Protocol (UDP), and
wherein the VPN handler includes a compression module that applies Lempel-Ziv (LZ) compression in conjunction with the IPSec connection to tunnel encrypted IP packets to the remote VPN security device.

17. The cellular mobile device of claim 1,
wherein the VPN handler establishes an Secure Socket Layer (SSL) control channel with the secure VPN gateway and, upon a successful authentication, receives a session cookie with a unique identifier,
wherein, in the event communication with the remote VPN security device is temporarily lost, the VPN handler performs a fast reconnect by issuing the session cookie to the secure VPN gateway, and
wherein, when performing the fast reconnect, the VPN handler identifies a set of transport mechanisms currently available to the cellular mobile device and, when only a cellular network is available and not a wireless packet-based connection, the VPN handler defers the fast reconnect until application-layer data is received from a user application and ready to be sent via the VPN connection.

18. A system comprising:
a virtual private network (VPN) security device coupled to a packet network;
a cellular mobile device comprising a microprocessor, an operating system executing on the microprocessor to provide an operating environment of application software, and a multi-service network client registered with the operating system as a single application,
wherein the multi-service network client comprises:
a VPN handler to exchange network packets with the operating system, wherein the VPN handler establishes a VPN connection with a remote VPN security device of an enterprise and processes to network packets for tunneling between the cellular mobile device and the remote VPN security device; and
a security manager to receive the network packets from the VPN handler and apply at least one security service to the network packets, a VPN control application that provides a unified user interface that allows a user to configure both the VPN handler and the security manager, wherein the VPN security device presents an interface by which an administrator defines a plurality of different roles for the user, wherein upon authenticating the user, the VPN security device selects a subset of the roles for the user, and wherein the VPN security device controls access to one or more protected resources by the user based on the selected subset of the roles.

19. A method comprising:

receiving, with a cellular mobile device from an electronic repository, a single distribution software package that includes a multi-service network client, wherein the multi-service network client includes a virtual private network (VPN) handler, a security manager; and a VPN control application that provides a unified user interface that allows a user to configure both the VPN handler and the security manager;

installing the multi-service network client on the cellular mobile device including registering the VPN handler with an operating system of the cellular mobile device, wherein the VPN handler provides a single point of entry for network packets from the operating system to apply VPN services with the VPN handler and security services with the security manager;

establishing, with the VPN handler, the VPN connection to concurrently include both a layer three (L3) tunnel that uses a first type of transport layer protocol of the operating system and a layer four (L4) tunnel that uses a second type of transport layer protocol of the operating system;

after establishing the L3 tunnel and prior to sending data on the L3 tunnel, determining, with the VPN handler, whether network ports associated with the L3 tunnel are unblocked by the operating system; and when the network ports are unblocked by the operating system, automatically transitioning from the L4 tunnel to the L3 tunnel with the VPN handler without terminating the VPN connection.

20. The method of claim 19, further comprising:

exchanging network packets between the VPN handler and the operating system for communication via the VPN connection.

21. The method of claim 20, further comprising:

processing the network packets with the VPN handler to tunnel the packets between the cellular mobile device and the remote VPN security device over the VPN connection; and while processing the packets with the VPN handler, routing the packets to the security manager and applying at least one security service to the network packets with the security manager.

22. A cellular mobile device comprising:

a transmitter and receiver to send and receive cellular communications in the form of radio frequency signals;

a microprocessor;

an operating system executing on the microprocessor to provide an operating environment of application software;

a multi-service network client downloaded to the cellular mobile device and registered with the operating system as a single application, wherein the multi-service network client comprises:

a virtual private network (VPN) handler to establish a VPN connection with a remote VPN security device upon authenticating a user to the remove security device, wherein the VPN handler encrypts output network packets and decrypts inbound network packets to securely tunnel the network packets between the cellular mobile device and the remote VPN security device; and a VPN control application that provides a unified user interface that allows a user to configure both the VPN handler and a security manager, wherein the VPN handler establishes the VPN connection to concurrently include both a layer three (L3) tunnel that uses a first type of transport layer protocol of the operating system and a layer four (L4) tunnel that uses a second type of transport layer protocol of the operating system, and wherein, after establishing the L3 tunnel and prior to sending data on the L3 tunnel, the VPN handler determines whether network ports associated with the L3 tunnel are unblocked by the operating system and, when the network ports are unblocked, automatically transitions from the L4 tunnel to the L3 tunnel without terminating the VPN connection.

23. The cellular mobile device of claim 22, wherein the multi-service network client comprises the security manager to receive the decrypted inbound network packets from the VPN handler and apply at least one security service to the decrypted network packets.

24. The cellular mobile device of claim 22, wherein the multi-service network client further comprises a data acceleration module that applies at least one acceleration service to the network packets from the VPN handler.

25. A non-transitory computer-readable medium storing a downloadable distribution package comprising software program code to execute a multi-service network client on a processor within a cellular device, wherein the multi-service network client comprises:

a virtual private network (VPN) handler to establish a VPN connection with a remote VPN security device upon authenticating a user to the remove security device, wherein the VPN handler encrypts output network packets and decrypts inbound network packets to securely tunnel the network packets between the cellular mobile device and the remote VPN security device;

a security manager to receive the decrypted inbound network packets from the VPN handler and apply at least one security service to the decrypted network packets; and a VPN control application that provides a unified user interface that allows a user to configure both the VPN handler and the security manager, wherein the VPN handler comprises software program code to establish the VPN connection to concurrently include both a layer three (L3) tunnel that uses a first type of transport layer protocol of the operating system and a layer four (L4) tunnel that uses a second type of transport layer protocol of the operating system, and wherein the VPN handler comprises software program code to determine, after establishing the L3 tunnel and prior to sending data on the L3 tunnel, whether network ports associated with the L3 tunnel are unblocked by the operating system and, when the network ports are unblocked, automatically transitions from the L4 tunnel to the L3 tunnel without terminating the VPN connection.

26. The non-transitory computer-readable medium of claim 25, wherein the first type of transport layer protocol is a connection-less transport protocol and the second type of transport layer protocol is a connection-oriented transport protocol.

27. The non-transitory computer-readable medium of claim 25,
- wherein the VPN handler sends initial data packets of the VPN connection on the L4 tunnel and, after establishing the L3 tunnel and prior to sending data on the L3 tunnel, sends a discovery packet over the L3 tunnel, and
- wherein the VPN handler automatically transitions from the L4 tunnel to the L3 tunnel when a reply to the discovery packet is received.

28. The non-transitory computer-readable medium of claim 25,
- wherein the multi-service network client comprises a single distribution package, and
- wherein the VPN control application presents a unified user interface for configuring anti-virus settings and personal firewall settings of the security manager.

* * * * *